(12) United States Patent
Zahdeh et al.

(10) Patent No.: US 12,539,715 B2
(45) Date of Patent: Feb. 3, 2026

(54) AUTONOMOUS TRANSPORT VEHICLE WITH STEERING

(71) Applicant: SYMBOTIC LLC, Wilmington, MA (US)

(72) Inventors: Akram Zahdeh, Wilmington, MA (US); Edward A. MacDonald, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 738 days.

(21) Appl. No.: 17/664,838

(22) Filed: May 24, 2022

(65) Prior Publication Data

US 2022/0380126 A1    Dec. 1, 2022

Related U.S. Application Data

(60) Provisional application No. 63/193,188, filed on May 26, 2021.

(51) Int. Cl.
*B60B 33/02* (2006.01)
*B60B 33/00* (2006.01)
(Continued)

(52) U.S. Cl.
CPC ........ *B60B 33/028* (2013.01); *B60B 33/0028* (2013.01); *B60B 33/026* (2013.01); *B65G 1/0492* (2013.01); *G05D 1/0088* (2013.01)

(58) Field of Classification Search
CPC . B60B 33/028; B60B 33/0028; B60B 33/026; B65G 1/0492; G05D 1/0088; G05D 1/0272
See application file for complete search history.

(56) References Cited

U.S. PATENT DOCUMENTS

| 6,988,570 B2* | 1/2006 | Takeuchi ............. B62D 11/183 |
| | | 318/432 |
| 8,965,619 B2* | 2/2015 | Sullivan ................. G05D 1/027 |
| | | 700/250 |

(Continued)

FOREIGN PATENT DOCUMENTS

| CN | 108974170 | 12/2018 |
| JP | 2013001230 | 1/2013 |

(Continued)

OTHER PUBLICATIONS

International Search Report, International Application No. PCT/US2022/072595 dated Nov. 8, 2022.

*Primary Examiner* — Kurt Philip Liethen
(74) *Attorney, Agent, or Firm* — Perman & Green, LLP

(57) ABSTRACT

An autonomous transport vehicle, for transporting items in a storage and retrieval system, includes a frame, a controller, at least two independently driven drive wheels mounted to the frame, and at least one caster wheel mounted to the frame and having a castering assistance motor that engages the at least one caster wheel so as to impart castering assistance torque to the at least one caster wheel assisting castering of the at least one caster wheel. The controller is communicably connected to the castering assistance motor and configured to effect via a combination of vehicle yaw, generated by differential torque from the at least two independently driven drive wheels, and castering assistance torque from the castering assistance motor, castering of the at least one caster wheel with the autonomous transport vehicle in motion with a predetermined kinematic state.

20 Claims, 9 Drawing Sheets

(51) Int. Cl.
*B65G 1/04* (2006.01)
*G05D 1/00* (2024.01)

(56) References Cited

U.S. PATENT DOCUMENTS

| | | | | |
|---|---|---|---|---|
| 10,730,346 | B2* | 8/2020 | Yuk | B60B 19/003 |
| 2007/0023209 | A1 | 2/2007 | Wu | |
| 2007/0269299 | A1* | 11/2007 | Ross | G05D 1/024 |
| | | | | 414/347 |
| 2008/0154429 | A1* | 6/2008 | Lee | G05D 1/0272 |
| | | | | 901/1 |
| 2009/0000839 | A1* | 1/2009 | Ishii | B62D 11/04 |
| | | | | 701/41 |
| 2009/0152828 | A1* | 6/2009 | Bebernes | B62D 5/09 |
| | | | | 280/86 |
| 2010/0180380 | A1* | 7/2010 | Van Scheppingen | A61G 7/08 |
| | | | | 180/19.1 |
| 2010/0206647 | A1* | 8/2010 | Ishii | B62D 9/00 |
| | | | | 180/6.24 |
| 2014/0324315 | A1* | 10/2014 | Brondum | B60B 33/021 |
| | | | | 701/70 |
| 2017/0131720 | A1 | 5/2017 | Sullivan et al. | |
| 2020/0156459 | A1 | 5/2020 | Henningsgard et al. | |
| 2020/0339350 | A1 | 10/2020 | Dooley et al. | |
| 2021/0129583 | A1* | 5/2021 | Parikh | F16C 33/58 |

FOREIGN PATENT DOCUMENTS

| | | |
|---|---|---|
| WO | 2012083060 | 6/2012 |
| WO | 2021076519 | 4/2021 |

\* cited by examiner

AUTONOMOUS TRANSPORT VEHICLE WITH STEERING

CROSS-REFERENCE TO RELATED APPLICATIONS

This application is a non-provisional of and claims the benefit of U.S. provisional patent application No. 63/193,188 filed on May 26, 2021, the disclosure of which is incorporated herein by reference in its entirety.

BACKGROUND

1. Field

The disclosed embodiment generally relates to material handling systems, and more particularly, to transports for automated storage and retrieval systems.

2. Brief Description of Related Developments

Generally automated storage and retrieval systems employ autonomous transport vehicles to transport cased goods or case units to and from storage locations in a storage array. These autonomous transport vehicles generally travel along decks that provide unconstrained travel of the autonomous transport vehicle. The decks provide access to picking aisles (along which case units are stored), in which picking aisles the travel of the autonomous transport vehicles is constrained (i.e., guided) by rails. Generally, these autonomous transport vehicles include casters on one (e.g., front) end and differentially driven drive wheels on the opposite (e.g., rear) end of the autonomous transport vehicle. These casters and drive wheels are also located on outer extents (e.g., the outer periphery and away from a center of mass of the autonomous transport vehicle) of the autonomous transport vehicle to effect transfer of case units to and from the autonomous transport vehicle.

Where the autonomous transport vehicle is constrained within a storage aisle, reversal of a direction of travel of the autonomous transport vehicle means that the casters rotate based on a direction of trail of the caster wheel. Here, a reversal of travel direction causes the caster wheel to rotate about a caster pivot axis about 180 degrees so that the caster wheel trails the direction of travel; however, there is no control over which direction the caster wheels rotates about the caster pivot axis (e.g., whether the caster wheels rotate towards or away from a respective rail on which the autonomous transport vehicle is travelling). Rotation of the caster wheel towards the respective rail may cause the autonomous transport vehicle to become wedged within the picking aisle and travel of the autonomous transport vehicle along the picking aisle may be prevented. To overcome this problem locking casters have been employed to lock rotation of the caster wheel about the caster pivot axis; however, the locking mechanism of the locking casters increases the mechanical complexity and cost of the autonomous transport vehicle. The performance of the autonomous transport vehicle may also be impacted by unlocking the rotation of the caster wheel about the caster pivot axis.

Placement of the drive wheels away from the center of mass of the autonomous transport vehicle increases an amount of drive wheel torque required for differential steering of the autonomous transport vehicle (compared to drive wheel torque required for differential steering with drive wheels placed at the center of mass). This additional torque requirement increases the size and cost of the drive motors and associated electronics, as well as increases frictional requirements between the drive wheels and driving surface. Frictional scrubbing of the caster wheels when rotating about the caster pivot axis during turning of the autonomous transport vehicle also increases amount of drive wheel torque required for differential steering of the autonomous transport vehicle as well as decreases a service life of the caster wheels and riding surfaces on which the caster wheels travel.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
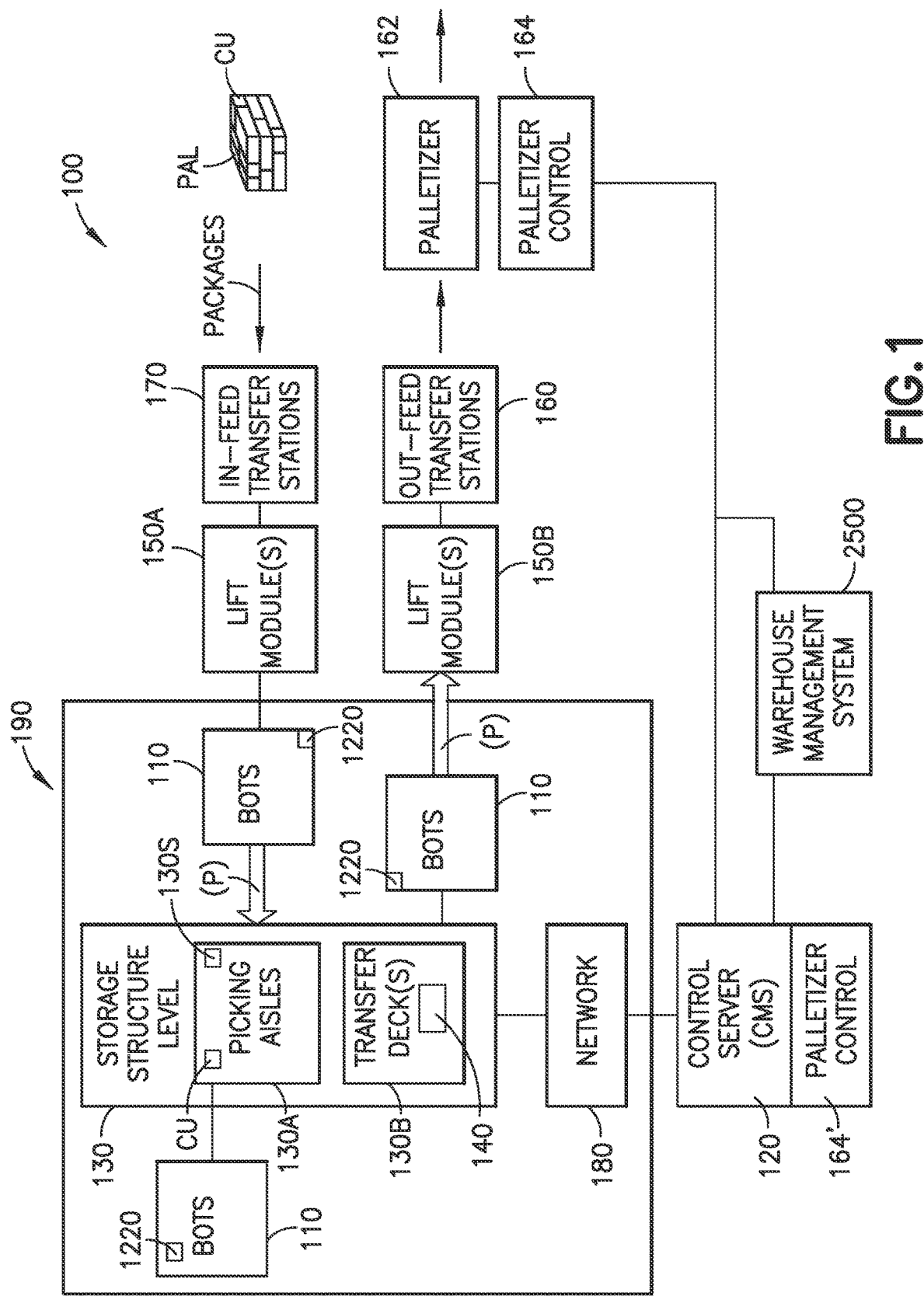
FIG. 1 is a schematic block diagram of a storage and retrieval system incorporating aspects of the disclosed embodiment.

FIG. 1 illustrates an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment provide for an automated storage and retrieval system 100 that includes a non-holonomic differential drive type autonomous transport vehicle 110 that has two degrees of freedom (i.e., linear and rotational motion). The aspects of the disclosed embodiment address one or more of the deficiencies noted above with respect to conventional autonomous transport vehicles. For example, the autonomous transport vehicle 110 includes independently controllable caster wheels 250 (also referred to as a caster) that are configured as independently controllable motorized caster wheels 600M (FIG. 2) (e.g., caster wheels that include motors capable of driving rotation of a wheel 610 of the caster wheel 250 about a caster pivot axis 691—see, e.g., FIG. 3A). The motorized caster wheels 600M provide for pivoting of the wheel 610 about the caster pivot axis 691 at least prior to forward or reverse translation of the autonomous transport vehicle 110 to prepare the autonomous transport vehicle for a turn which may provide about a 20% faster turn of the autonomous transport vehicle 110 compared to turning with differential drive wheel 260A, 260B steering alone. As will be described herein, the motorized caster wheels 600M provide for pivoting of the wheel 610 about the caster pivot axis 691 with translation of the autonomous transport vehicle 110 (i.e., with the autonomous transport vehicle 110 in motion) to one or more of maintain a steady state orientation of the wheel 610 and to assist with steering of the autonomous transport vehicle 110. A feedforward control is applied to each of the motorized caster wheels 600M to independently control a turning/steering angle of the motorized caster wheels 600M relative to a travel/turn path of the autonomous transport vehicle 110 so that the motorized caster wheels 600M provide substantially zero scrub (e.g., substantially zero lateral frictional forces are exerted on the wheel 610 by a travel surface along which the caster traverse) along the travel/turn path.

In accordance with the aspects of the disclosed embodiment, the substantially zero scrub caster wheel 250 movement along the travel/turn path of the autonomous transport vehicle 110 minimizes an amount of energy exerted by drive units 261 of the autonomous transport vehicle 110 drive wheels 260 (see, e.g., FIG. 2) when making a turn by about 20%, compared to making a turn with caster scrub (e.g., with caster scrub the amount of energy needed to turn is increased such that some of the energy is used in overcoming frictional forces due to scrubbing of the caster wheel on the travel surface). Minimizing the amount of energy needed to drive/turn the autonomous transport vehicle 110 provides for optimization of the drive motors 261M of the drive units 261 for linear inertial changes of the autonomous transport vehicle rather than being configured for generating moments large enough to induce castering of the caster wheels 250. Here optimization of the drive motors 261M, and the drives 261 in general, includes at least a reduction in drive motor 261M (see, e.g., FIG. 2) size (and a reduction in size of the associated electronics for driving the drive motor 261M) as well as a reduction in frictional requirements between the drive wheels 260 and the travel surface (which reduces wear of the wheels and wear of the travel surfaces on which the wheels traverse). The aspects of the disclosed embodiment also provide for decreasing a weight and cost of the autonomous transport vehicle 110 by virtue of the reduction in size of the drive motors 261M and associated electronics.

In accordance with the aspects of the disclosed embodiment, the automated storage and retrieval system 100 in FIG. 1 may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, and shipping units) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases filling replenishment orders, the pallets may contain any suitable number and combination of different case units (e.g. each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system 100 may be generally described as a storage and retrieval engine 190 coupled to a palletizer 162. In greater detail now, and with reference still to FIG. 1, the storage and retrieval system 100 may be configured for installation in, for example, existing warehouse structures or adapted to new warehouse structures. As noted before the automated storage and retrieval system 100 shown in FIG. 1 is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the autonomous transport vehicles 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system may also include robot or bot transfer stations (not shown) that may provide an interface between the autonomous transport vehicles 110 and the lift module(s) 150A, 150B. The storage structure 130 may include multiple levels of storage rack modules where each level includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the autonomous transport vehicles 110 (such as along rails 800—see FIG. 4)) while in other aspects the picking aisles are configured to provide unrestrained travel of the autonomous transport vehicle 110 (e.g., the picking aisles are open and undeterministic with respect to autonomous transport vehicle 110 guidance/travel). The transfer decks 130B have open and undeterministic (e.g., physically unconstrained) bot support travel surfaces along which the autonomous transport vehicles 110 travel under guidance and control provided by bot steering (as will be described herein). In one or more aspects, the transfer decks have multiple lanes between which the autonomous transport vehicles 110 freely transition for accessing the picking aisles 130A and/or lift modules 150A, 150B. The picking aisles 130A, and transfer decks 130B also allow the autonomous transport vehicles 110 to place case units CU into picking stock and to retrieve ordered case units CU. In alternate aspects, each level may also include respective bot transfer stations 140. The autonomous transport vehicles 110 may be configured to place case units, such as the above described retail merchandise, into picking stock in the one or more levels of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more levels of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100. It is noted that while the aspects of the disclosed embodiment are described with respect to a multilevel storage array, the aspects of the disclosed embodiment may be equally applied to a single level storage array that is disposed on a facility floor or elevated above the facility floor.

As may be realized, the storage and retrieval system 100 may include multiple in-feed and out-feed lift modules 150A, 150B that are accessible by, for example, autonomous transport vehicles 110 of the storage and retrieval system 100 so that one or more case unit(s), uncontained (e.g. case unit(s) are not held in trays), or contained (within a tray or tote) can be transferred from a lift module 150A, 150B to each storage space on a respective level and from each storage space to any one of the lift modules 150A, 150B on a respective level. The autonomous transport vehicles 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as control server 120 or other suitable controller coupled to control server 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the autonomous transport vehicles 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) managing the case flow system. The network 180 may further include suitable communication for effecting a bi-directional interface with the autonomous transport vehicles 110. For example, the autonomous transport vehicles 110 may include an on-board processor/controller 1220. The network 180 may include a suitable bi-directional communication suite enabling the autonomous transport vehicle controller 1220 to request or receive commands from the control server 180 for effecting desired transport (e.g. placing into storage locations or retrieving from storage locations) of case units and to send desired autonomous transport vehicle 110 information and data including autonomous transport vehicle 110 ephemeris, status and other desired data, to the control server 120. As seen in FIG. 1, the control server 120 may be further connected to a warehouse management system 2500 for providing, for example, inventory management, and customer order fulfillment information to the CMS level program of control server 120. A suitable example of an automated storage and retrieval system arranged for holding and storing case units is described in U.S. Pat. No. 9,096,375, issued on Aug. 4, 2015 the disclosure of which is incorporated by reference herein in its entirety.

Figure 2:
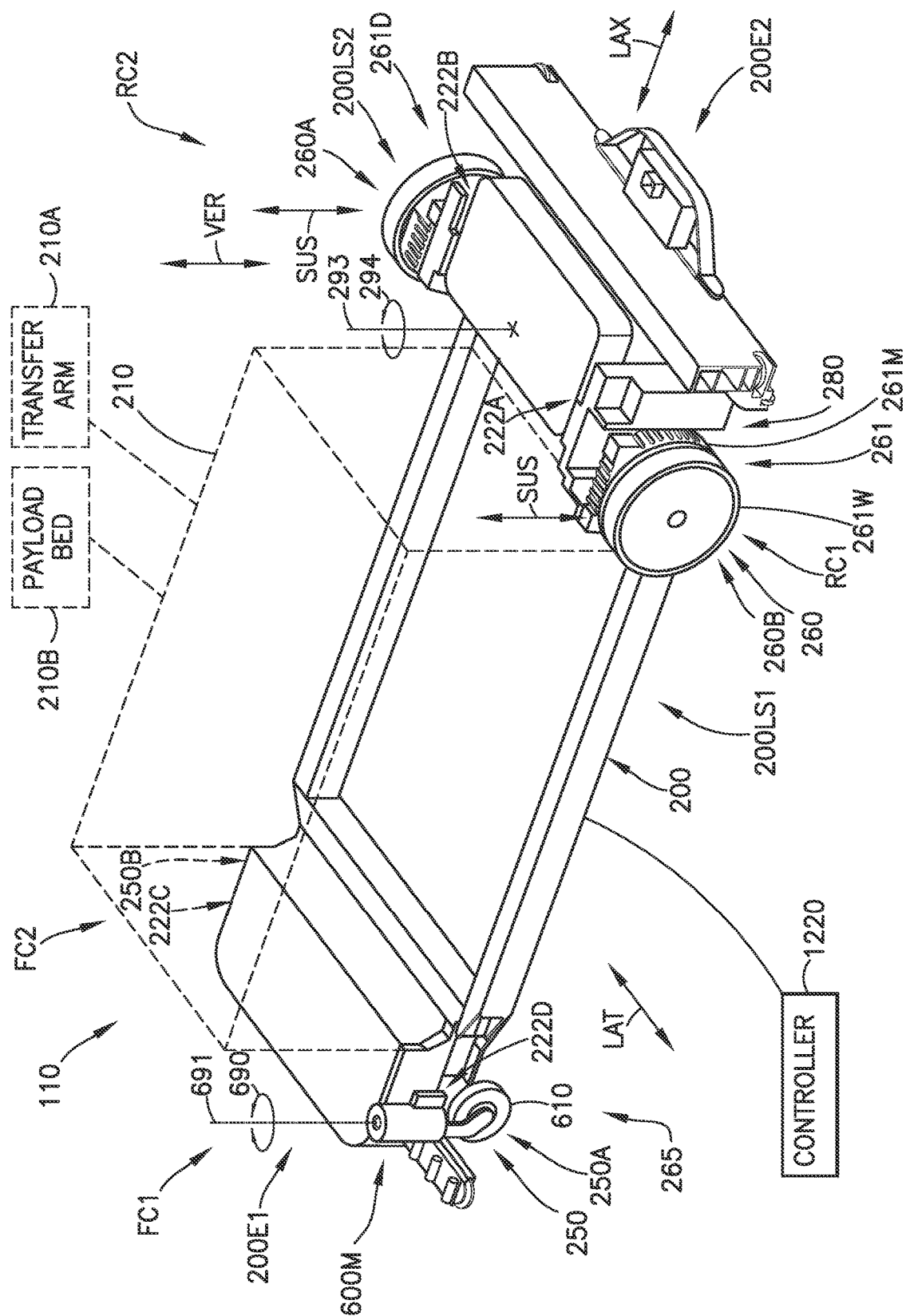
FIG. 2 is a schematic perspective illustration of an autonomous transport vehicle of the storage and retrieval system of FIG. 1 in accordance with aspects of the disclosed embodiment.

Referring now to FIG. 2, the autonomous transport vehicle or bot 110 (which may also be referred to herein as an autonomous guided vehicle) includes a frame 200 with an integral payload support or bed 210B. The frame 200 has a front end 200E1 and a back end 200E2 between which extends a longitudinal axis or axis of symmetry LAX of the autonomous transport vehicle 110. The frame 200 may be constructed of any suitable material (e.g., steel, aluminum, composites, etc.) and includes a case handling assembly 210 configured to handle cases/payloads transported by the autonomous transport vehicle 110. The case handling assembly 210 includes any suitable payload bed 210B on which payloads are placed for transport and/or any suitable transfer arm 210A connected to the frame and configured for autonomous transfer of payload(s) to and from the frame 200 (e.g., transfer of payload(s) between the autonomous transport vehicle 110 and a payload holding location, such as any suitable payload storage location, a shelf of lift module 150A, 150B, and/or any other suitable payload holding location). The transfer arm 210A is configured to extend laterally in direction LAT and/or vertically in direction VER to transport payloads to and from the payload bed 210B. Examples of suitable payload beds 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes at least one idler wheel or caster wheel 250 mounted to the frame and disposed adjacent the front end 200E1. The frame also includes at least two independently driven drive wheels 260 mounted to the frame and disposed adjacent the back end 200E2. In other aspects, the position of the at least one caster wheel 250 and drive wheels 260 may be reversed (e.g., the drive wheels 260 are disposed at the front end 200E1 and the at least one caster wheel 250 is disposed at the back end 200E2). It is noted that in some aspects, the autonomous transport vehicle 110 is configured to travel with the front end 200E1 leading the direction of travel or with the back end 200E2 leading the direction of travel. In one aspect, caster wheels 250A, 250B (which are substantially similar to caster wheel 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous transport vehicle 110 stably traverses the transfer deck(s) 130B and picking aisles 130A of the storage structure 130.

The autonomous transport vehicle 110 includes a drive section 261D connected to the frame 200. The drive section 261D has, as noted above, at least two independently driven drive wheels 260 (also referred to as traction wheels 260) astride the drive section 261D. The drive section includes a drive unit 261 for each drive wheel 260, where each drive unit 261 is coupled to the frame 200 in any suitable manner, so that each drive wheel 260 is independently movable (e.g., independently driven by a respective drive motor of a respective drive unit). It is noted that each drive unit 261 comprises any suitable drive motor 261M and a wheel 261W. Each of the drive motors 261M is coupled to and rotationally drives a respective wheel 261W so as to propel the autonomous transport vehicle 110 in a travel direction. Here the motors 261M of two drive wheels 260A, 260B may be operated at the same time and at substantially the same rotational speed to propel the autonomous transport vehicle 110 in a substantially straight line path of travel. In other aspects, the motors 261M of the two drive wheels 260A, 260B may be operated at the same time (or at different times) and at different rotational speeds to generate a vehicle yaw to propel the autonomous transport vehicle 110 along an arcuate path of travel or to pivot the autonomous transport vehicle in direction 294 about vehicle pivot axis 293. The vehicle pivot axis 293 may be located at an origin 900 (see FIG. 5) of the autonomous transport vehicle 110 that is about midway between the two drive wheels 260A, 260B and positioned on the axis of symmetry LAX. The differential operation of the motors 261M of the respective drive wheels 260A, 260B that effects turning and/or pivoting of the autonomous guided vehicle 110 as described above is referred to herein as differential drive wheel steering which, in accordance with the disclosed embodiment, is aided/supplemented by castering assistance of the at least one caster wheel 250.

Figure 3A:
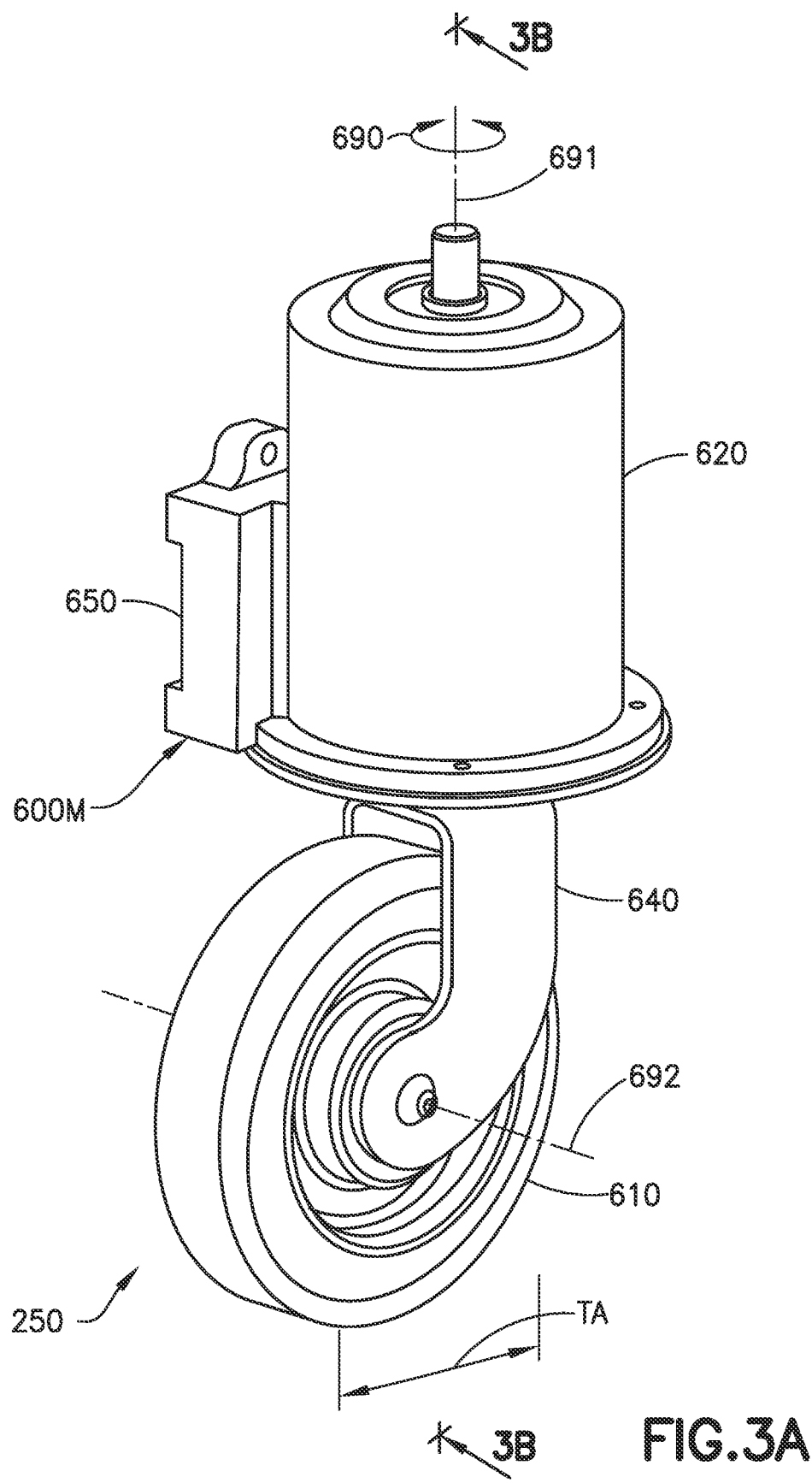
FIG. 3A is a perspective illustration of a portion of the autonomous transport vehicle of FIG. 2 in accordance with aspects of the disclosed embodiment.
Figure 3B:
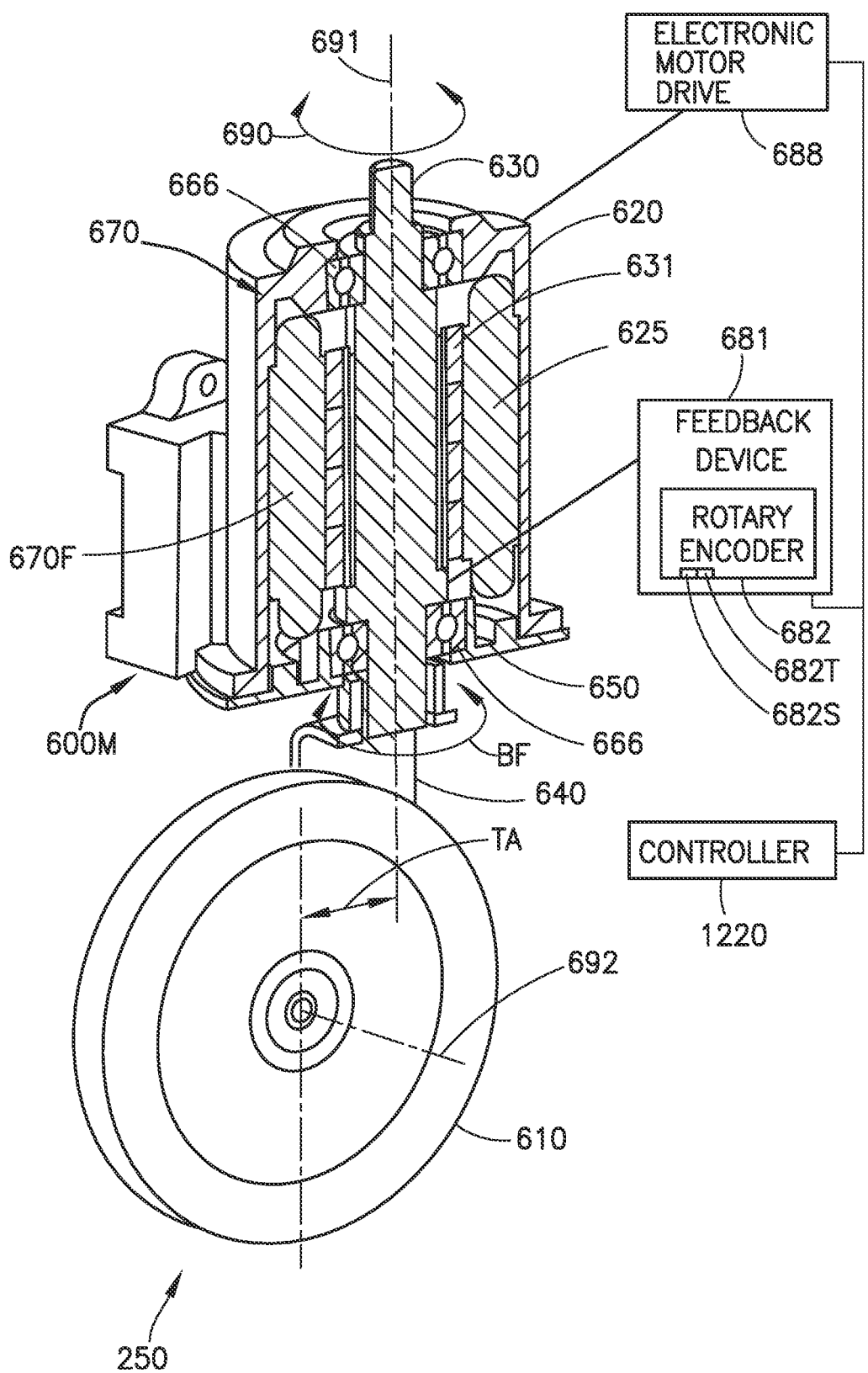
FIG. 3B is a cross-sectional illustration of the portion of the autonomous transport vehicle shown in FIG. 3A in accordance with aspects of the disclosed embodiment.

As described above, the frame 200 includes at least one caster wheel 250 mounted to the frame 200 and disposed adjacent the front end 200E1. The at least one caster wheel 250 is part of a non-holonomic steering system 265 (which non-holonomic steering system includes the at least one caster wheel 250, the at least two differentially driven drive wheels 260, and controller 1220 as described herein). In one aspect, a caster wheel 250A, 250B is located adjacent each front corner of the frame 200 so that in combination with the drive wheels 260A, 260B disposed at each rear corner of the frame 200, the frame 200 stably traverses the transfer deck 130B and picking aisles 130A of the storage structure 130. Referring to FIGS. 2, 3A, and 3B in one aspect, each caster wheel 250 comprises a motorized caster wheel 600M. In one aspect, the motorized caster wheel 600M has a castering assistance electromagnetic actuator or motor 670 (as will be described in greater detail below), and at least one wheel 610. The castering assistance motor 670 engages the at least one wheel 610 so as to impart castering assistance torque to the at least one caster wheel 250 assisting castering of the at least one caster wheel 250. Here, the castering assistance motor 670 imparts a bias force BF (FIG. 3B) to the caster wheel 250 at each castering position (e.g., at each rotation position of the wheel 610 relative to a respective caster pivot axis 691) of the caster wheel 250. The bias force BF substantially negates, as described herein in a manner similar to a commanded castering assistance torque τcd, one or more of castering resistance (e.g., torque induced about the caster pivot axis 691) imparted to the at least one caster wheel 250 from castering scrub (as described herein) and resistance (e.g., moments or torque generated by castering scrub that acts about the origin 900 and is counter to drive motion torque τd—see FIG. 5—is substantially negated) from castering scrub imparted against vehicle yaw moment generated by the differential torque from the at least two independently driven drive wheels 260A, 260B.

Each motorized caster wheel 600M is configured to actively pivot its respective wheel 610 (independent of the pivoting of other wheels of other motorized casters) in direction 690 about caster pivot axis 691 to at least assist (e.g., assist the differential steering) in effecting a change in the travel direction of the autonomous transport vehicle 110 as will be described in greater detail herein. The motorized caster wheel(s) 600M may provide for faster steering response compared to, for example, the conventional steering of an autonomous transport vehicle with differential drive wheel steering alone where the autonomous transport vehicle includes passive (e.g., non-motorized) casters (i.e., referred to differential drive wheel steering paired with passive casters). The motorized caster wheel(s) 600M may also provide for, when used in combination with the differential drive wheel steering, a lesser torque being applied by the drive wheels to differentially steer the autonomous transport vehicle 110 (e.g., from rest (such as for a zero-radius turn/pivoting of the autonomous transport vehicle about its origin 900 or to initiate a arcuate trajectory from rest) or while in motion) compared to the differential drive wheel steering paired with passive casters. Here each of the motorized caster wheel(s) 600M may be operated in one or more of a torque assist mode and a steering mode. In the torque assist mode the motorized caster wheel(s) 600M are used in conjunction with differential drive wheel steering to reduce the torque required by the drive wheels to differentially steer the autonomous transport vehicle 110 as noted above. In the steering mode the motorized caster wheel(s) 600M provide for steering of the autonomous transport vehicle 110 substantially without differential drive wheel steering. It is noted that while the motorized casters 600M include motors 670 for driving rotation of a respective wheel 610 about a respective pivot axis 691, the motor/caster is configured such that when motor torque is not applied for rotating the wheel 610 about pivot axis 691, the wheel 610 is in one or more aspects free to pivot about the respective axis 691 (i.e., in a manner substantially similar to that of a passive/un-motorized caster); while in other aspects the motor/caster is configured to bias the wheel 610 against castering about the pivot axis 691 and maintain the caster wheel 250 in a predetermined steady state position (e.g., relative to the pivot axis and/or the axis of symmetry LAX) with the autonomous transport vehicle 110 in motion as will be described herein.

Referring to FIGS. 3A and 3B, each motorized caster 600M includes a caster mount housing 620 (also referred to herein as a caster housing) that is configured to house the castering assistance motor 670. The castering assistance motor 670, is in one or more aspects, a frameless motor 670F that is integrated in the caster housing 620. For example, the frameless motor 670F (also referred to as motor 670) is integrated into a caster frame 650 of the caster housing 620; however, in other aspects the motorized casters 600M may include any suitable motors for driving rotation of the respective wheel 610 about the respective pivot axis 691. The frameless motor 670 may be a servo motor, a stepper motor, or any other suitable type of motor configured to provide controlled intermittent bi-directional rotation of the wheel 610 about the pivot axis 691. Generally, the frameless motor 670F includes a motor rotor 631 and a motor stator 625 that are both built into a machine assembly (such as the caster assembly) to transmit torque to drive rotation of the wheel 610 of the motorized caster 600M. The motor stator 625 is coupled to the caster housing 620 (so as to be integrated with the caster housing 620). For example, the motor stator 625 is disposed against and supported by the caster housing 620. The motor rotor 631 is disposed against a caster pivot shaft 630, where the caster pivot shaft 630 pivotally joins at least one wheel 610 to the caster housing 620. Here the motor rotor 631 is coupled to the caster pivot shaft 630 so as to be integrated with the caster pivot shaft 630. The caster pivot shaft 630 is rotatably coupled to the caster frame 650 of the caster housing 620 by any suitable bearings 666, where caster housing 620 houses at least a portion of the caster pivot shaft 630 and the caster pivot shaft 630 is driven in rotation about axis 691 by the frameless motor 670. As will be described herein, the wheel 610 is mounted to a wheel fork 640 that is in turn coupled to or integral with the caster pivot shaft 630 (see FIGS. 3A and 3B) in any suitable manner for rotation, with the caster pivot shaft 630, about axis 691. The caster wheel 610 is coupled to the wheel fork 640 about an axis of rotation 692 of the wheel fork 640. The wheel fork 640 is coupled to, or in other aspects is formed integrally with, the caster pivot shaft 630 so as to rotate with the caster pivot shaft 630 as a single unit about pivot axis 691.

Referring to FIG. 3B, to detect the rotation angle of the respective wheel 610 about the pivot axis 691 each motorized caster 600M includes any suitable feedback device 681, such as a rotary encoder 682 or other suitable sensor. For example, a rotary encoder track 682T may be affixed to (or integral with) the caster pivot shaft 630 in any suitable manner (so as to rotate as a unit with the caster pivot shaft 630 and the caster wheel 610 about the axis 691). A sensor 682S configured to read the encoder track may be mounted to the frame 650 at a fixed location of the frame 650. The feedback device 681 is coupled to one or more of the controller 1220 and an electronic motor drive 688 for providing feedback signals that embody a wheel rotation position relative to a predetermined (e.g., a home, zero, or starting position) wheel orientation about axis 691, wheel rotation direction about axis 691, and a wheel rotation speed about the axis 691. The feedback device 681 is configured to determine one or more of an absolute and incremental position of the caster pivot shaft 630 (and hence the wheel 610) about the axis 691.

The motor 670 of the motorized caster 600M is configured to (e.g., under control of controller 1220—see, e.g., FIG. 1) apply a variable amount of torque along the pivot axis 691 for rotating the caster wheel 610. Here, each motorized caster 600M is driven by the electronic motor drive 688 that is configured receive motor current/torque commands from the controller 1220 (see FIGS. 1 and 7) and implement those motor current/torque commands (e.g., to the motor 670) to effect rotating the wheels 610 about the respective axis 691. The electronic motor drive 688 is configured so as to receive frequently updated motor currents/torques (e.g., substantially real time updates to the motor currents that are commanded by the controller 1220 and that are processed by the electronic motor drive 688 in the order of milliseconds).

Here, each motor 670 is sized to provide a sufficient amount of torque for rotating a respective caster wheel 610 about axis 691 in a predetermined direction (e.g., with the autonomous transport vehicle stationary or not traversing the travel surface 394, of the transfer decks 130B and inclusive of the rails 800 in the picking aisles 130A), which sufficient amount of torque is matched to an amount of traction/friction between the caster wheels 610 and the travel surface 395. The controller 1220 is configured to apply a castering assistance torque τc (also referred to as torque τc), with the motor 670, to the at least one wheel 610 biasing the at least one wheel 610 in a castering direction to a predetermined skew orientation (as described herein with respect to FIGS. 5 and 6) with the autonomous transport vehicle 110 at rest or in motion.

Figure 4:
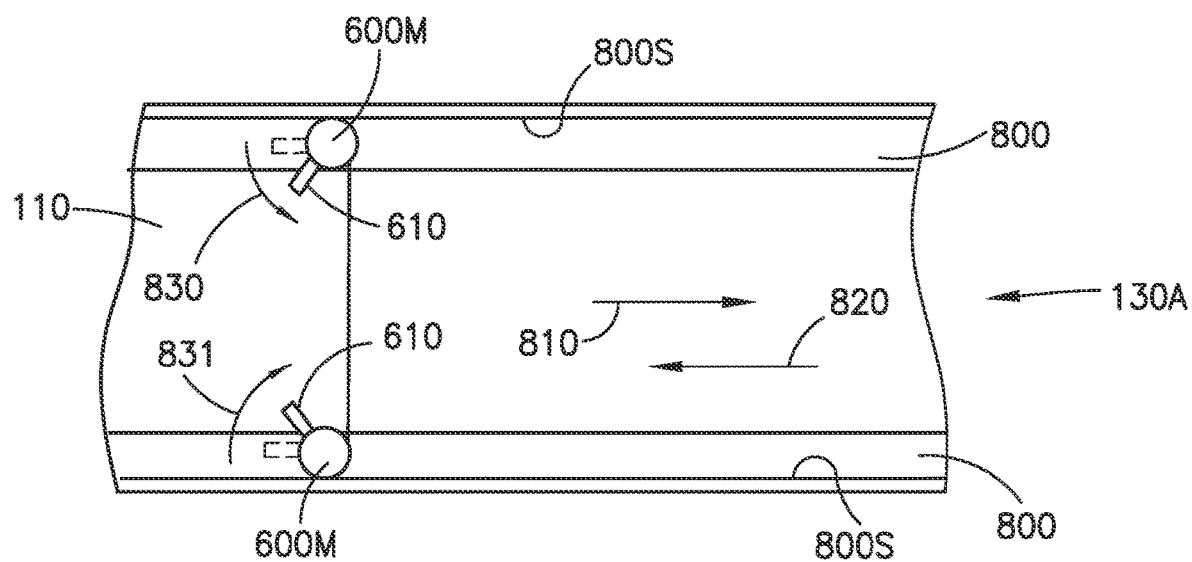
FIG. 4 is a schematic plan illustration of autonomous transport vehicle traverse in a picking aisle in accordance with aspects of the disclosed embodiment.

As an example, referring also to FIG. 4, the autonomous transport vehicle 110 may be travelling along rails 800 within the picking aisles 130A in direction 810 and is to reverse the travel direction so as to travel in direction 820. The controller 1220 is configured to issue commands to the electronic motor drive 688 for each motorized caster 600M so that the respective wheel 610 is rotated in a direction 830, 831 away from the sides 800S of the picking aisle 130A (i.e., the wheels are rotated towards a center of the picking aisle 130A) so that the wheels 610 are not wedged against the sides 800S of the rails 800. Here, torque is applied by the motor 670 of the motorized caster wheel 600M when the autonomous transport vehicle 110 changes the direction of travel within the picking aisle 130A so that the trail of the caster wheel 610 flips or turns about 180 degrees. The torque is applied by the motor 670 to the caster pivot shaft 630 (and hence to the wheel 610) in direction 830, 831 so that the wheel 610 rotates inwardly towards a center of the picking aisle 130A as described above. It is noted that the wheel 610 behaves in a manner similar to that of an inverted pendulum and only a minimal bias (e.g., amount of torque) is needed from the motor 670 to initiate inward rotation of the caster wheel 610 about caster pivot axis 691 in combination with the autonomous transport vehicle 110 traverse along the picking aisle 130A. Here, caster locking mechanisms and special autonomous transport vehicle behaviors (e.g., slowing down to unlock the caster wheel, reduce pre-loads, and manage caster wheel wear) are substantially eliminated.

Figure 6:
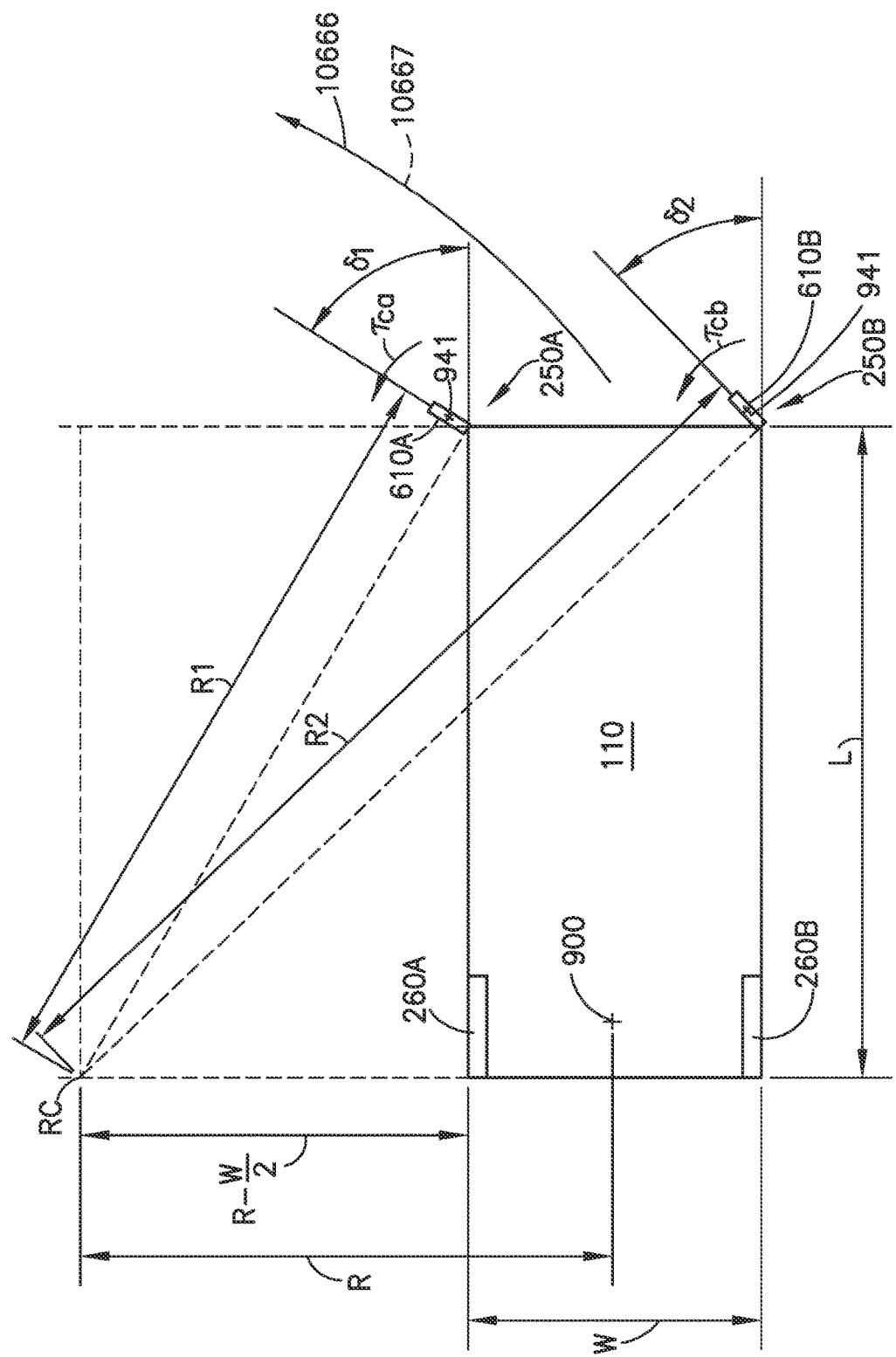
FIG. 6 is a schematic plan illustration of a portion of the autonomous transport vehicle of FIG. 2 in accordance with aspects of the disclosed embodiment.

As another example, Referring to FIG. 6, where the autonomous transport vehicle 110 is disposed on a non-deterministic surface such as the, flat and open transfer deck 130B, the autonomous transport vehicle 110 may be at rest (i.e., not traversing in a travel direction), where the autonomous transport vehicle is to initiated a turn from rest so as to pivot about its origin 900. In other aspects, the autonomous transport vehicle 110 is travelling along the transfer deck 130B and is to initiate a turn while in motion. Here, in one or more aspects, the controller 1220 is communicably connected to the castering assistance motor 670 and is configured to effect via a combination of vehicle yaw, generated by differential torque from the at least two independently driven drive wheels 260A, 260B, and castering assistance of the at least one caster wheel 250A, 250B with the autonomous transport vehicle 110 in motion with a predetermined kinematic state (e.g., vehicle trajectory 10667—FIG. 6—which trajectory defines the kinematics of the autonomous transport vehicle 110 along a given path). In one or more aspects, the controller 1220 is communicably connected to the castering assistance motor 670 and is configured to effect, via castering assistance torque τc from the castering assistance motor 670 assisting castering input from vehicle yaw generated by differential torque from the at least two independently driven drive wheels 260A, 260B, substantially scrubless castering of the at least one caster wheel 250 with the autonomous transport vehicle 110 in motion with a predetermined kinematic state (e.g., vehicle trajectory). In one or more aspects, the controller 1220 is communicably connected to the castering assistance motor 670 and is configured to effect castering of the at least one caster wheel 250 with the autonomous transport vehicle 110 in motion with a predetermined kinematic state via combination of vehicle yaw, generated by differential torque from the at least two independently driven drive wheels 260A, 260B, and castering assistance torque τc, from the castering assistance motor 670, where the castering assistance torque τc is developed to substantially negate resistance from castering scrub in each predetermined kinematic state of the autonomous transport vehicle 110. For example, the controller 1220 may apply a castering assistance torque τc to the caster wheels 250A, 250B so that each respective wheel 610A, 61B is biased in a castering direction to a respective skew orientation (e.g., respective zero-scrub angles δ1, δ2. Biasing the wheels 610 to the respective skew orientation may reduce an amount of power (e.g., of the drive wheel motors 261M) that differentially drives the drive wheels 260A, 260B to initiate turning (e.g., traverse along an arcuate path) of the autonomous transport vehicle 110 from rest or with the autonomous transport vehicle 110 in motion as described herein. In one or more aspects, the controller 1220 is configured to determine the torque τc as a supplemental torque that supplements castering input to the at least one caster wheel 250, from the vehicle yaw, to effect scrubless castering of the at least one caster wheel 250.

It is noted that the castering assistance motor 670 is configured so that a maximum castering assistance torque τcm (FIG. 5) is a motor rated (full-load) torque (i.e., the torque required to produce the rated power of the motor at full-load speed without the motor overheating) of the motor 670. It is also noted that a commanded castering assistance torque τcd (FIG. 5, see also the motor torque commands in FIG. 7) is configured wherein resistance from castering scrub at each predetermined kinematic state (e.g., of the autonomous transport vehicle 110) is substantially negated so as to effect a substantially scrubless castering of the caster wheel 250 along and throughout each vehicle path, such as vehicle path 10666 (see FIG. 6) via the commanded castering assistance torque τcd, substantially independent of the vehicle path 10666 and the kinematic state. As described herein, in one or more aspects, the commanded castering assistance torque τcd for each respective caster wheel 250A, 250B, of the at least one caster wheel 250, is determined independently for each respective caster wheel 250A, 250B so as to effect substantially scrubless castering of each respective caster wheel 250A, 250B substantially independent of the vehicle path and the kinematic state. In one or more aspects, as described herein, the commanded castering assistance torque τcd for each respective caster wheel 250A, 250B, of the at least one caster wheel 250, is independently determined to effect substantially scrubless castering of each respective caster wheel, and wherein the castering assistance torque τc respectively commanded for each corresponding caster wheel 250A, 250B varies between corresponding caster wheels 250A, 250B of the at least one caster wheel 250 based on turn radius (e.g., an instantaneous turn radius or a steady state turn radius—see FIG. 6 where the castering assistance torque τca for caster wheel 250A may be greater than the castering assistance torque τcb for caster wheel 250B to achieve the respective zero-scrub angles δ1, δ2). The commanded castering assistance torque Tcd substantially negates one or more of castering resistance (e.g., torque) imparted to the at least one caster wheel 250 from castering scrub and resistance (e.g., moments) from castering scrub imparted against vehicle yaw moment generated by the differential torque from the at least two independently driven drive wheels 260A, 260B.

Figure 5:
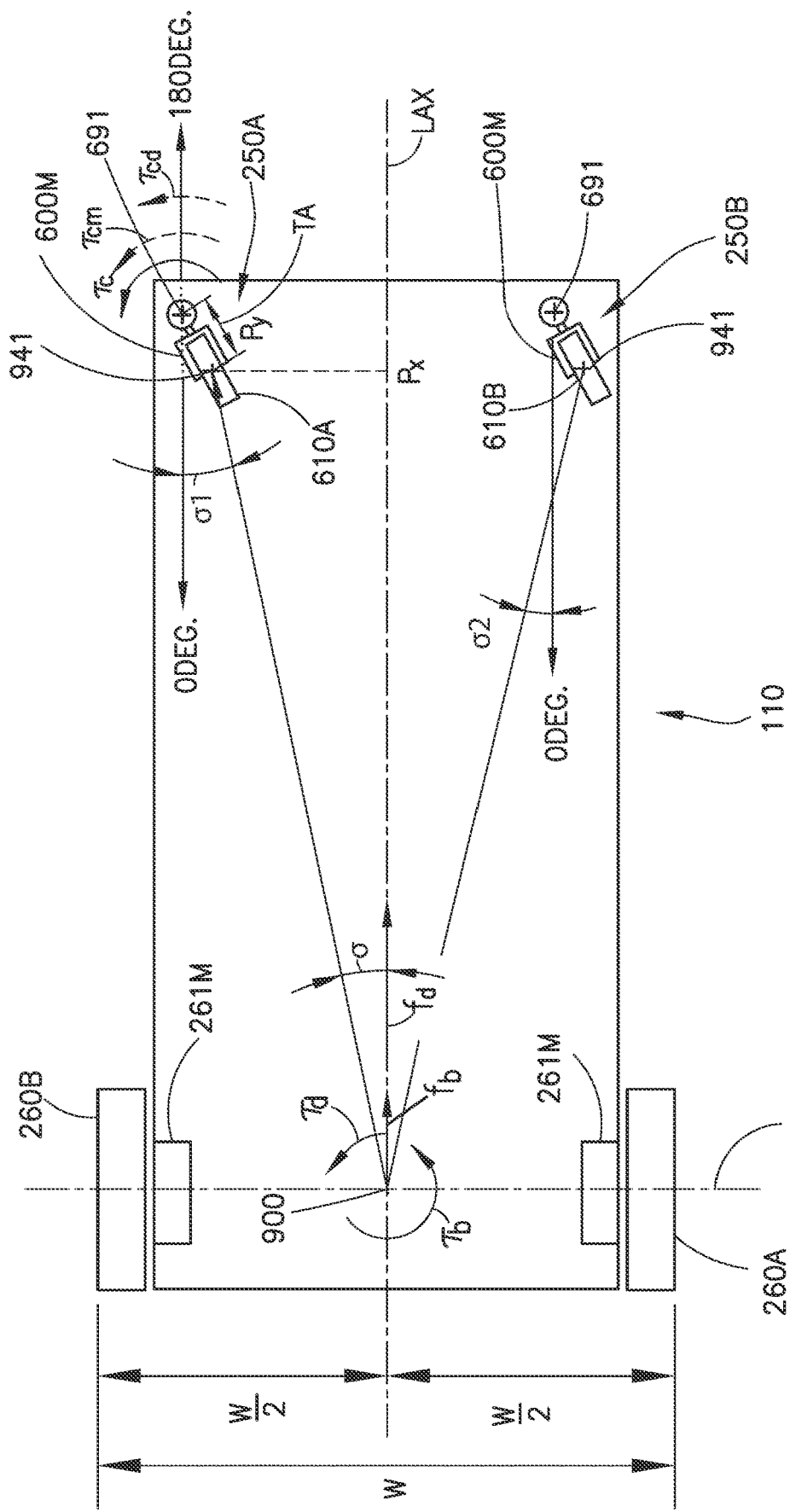
FIG. 5 is a schematic plan illustration of a portion of the autonomous transport vehicle of FIG. 2 in accordance with aspects of the disclosed embodiment.

Referring to FIGS. 3B and 5, when the torque τc is applied to the castor pivot axis 691 by the motor 670 (e.g., based on the commanded torque τcd), a proportional torque/moment (referred to herein as moment τb) is applied to an origin 900 of the autonomous transport vehicle 110, where the moment τb applied origin 900 depends on the angle σ1, σ2 of the caster wheel pivot point 941 (i.e., the point of contact (or a center of contact area/patch) between the caster wheel 610A, 610B and the travel surface 395). The origin 900 being located at a center point W/2 (e.g., about half the width W of the autonomous transport vehicle—e.g., substantially on the axis of symmetry LAX) between the two drive wheels 260A, 260B and along an axis 971 defined by and extending between the rotation axis of each drive wheel 260A, 260B. For example, the moment τb at the origin 900 is expressed by the following:

$$\tau_b = \left(\frac{\tau_c}{TA}\right)(p_x\cos(\sigma) + p_y\sin(\sigma)) \quad \text{[EQ. 1]}$$

where, τc is the torque applied at the castor pivot axis 691, TA is the length of the caster pivot arm (e.g., the caster trail—see FIGS. 3A, 3B, and 5), Px and Py are the components (e.g. distances) of the vector from the origin 900 to the caster wheel pivot point 941, and σ is the angle σ1 or σ2 of the caster wheel 610A or 610B. A linear force fb applied at the origin 900 and along a centerline or longitudinal axis LAX of the autonomous transport vehicle 110 as a result of the torque τc applied to the castor pivot axis 691 by the motor 670 is expressed by the following:

$$f_b = -\left(\frac{\tau_c}{TA}\right)\sin(\sigma) \quad \text{[EQ. 2]}$$

It is noted that the ratio Px/TA that results from an angle σ of the caster wheel pivot point 941 of about 0 degrees or about 180 degrees (see FIG. 5) is a moment multiplier that results from a "small" trailing arm TA compared to the distance Px of the caster wheel pivot point 941 from the drive wheels). As an example, for the geometry of the autonomous transport vehicle 110 illustrated in the figures (e.g., exemplified by FIG. 5) the ratio of Px/TA results in the torque τb applied about the origin 900 (as a result of caster wheel 610 pivoting) being about forty-eight times greater than the torque τc applied at the caster pivot axis 691. In comparison, the torque τd applied at the origin 900 (as a result of differential steering with the drive wheels 260A, 260B) is about four times greater than the torque applied to the drive wheels 260A, 260B. As may be realized from the above, initiating a turn of the autonomous transport vehicle 110 (e.g., with the caster wheels 610 at the about 0 degree or about 180 degree angular orientation, either from rest or with the autonomous transport vehicle in motion) by applying torque τc at the caster pivot axis 691 of each motorized caster 600M is more efficient than initiating the turn with only differential torque applied to the drive wheels 260A, 260B. Here, by initiating the turn of the autonomous transport vehicle 110 with the motorized casters 600M a reduction in the size of the drive motors 261M and associated electronics (e.g., electronic motor drives, amplifiers, etc.) is effected as the torque τb supplements torque τd. As may also be realized from the above, the larger moments generated at the origin 900 by the motorized casters 600M (e.g., with the caster wheels 610 at the about 0 degree or about 180 degree angular orientation) provide for a faster steering response when compared to the moments generated at the origin 900 by the drive wheels 260A, 260B and the steering response provided thereby.

Referring to FIGS. 1 and 4, as noted above, the motorized casters 600M may be employed for autonomous transport vehicle 110 travel in the picking aisles 130A and along the transfer deck 130B. For example, as described above, torque τc is applied to the caster wheels 610 by the respective motor 670 to bias rotation of the caster wheels 610 inwards towards a center of the picking aisle to effect a change in travel direction of the autonomous transport vehicle 110 along the rails 800 of the picking aisle 130A. It is noted that other than the bias torque to initiate rotation of the caster wheel 610 about the caster pivot axis 691 in an inward direction, no torque is applied to the caster pivot shaft 630 by the motor 670 during autonomous transport vehicle 110 traverse along the picking aisle (e.g., the caster wheels 610 are allowed to rotate freely so as to naturally align, due to caster wheel trail, with a direction of movement along the picking aisle 130A rails 800).

For autonomous transport vehicle 110 travel along the transfer deck 130B the motorized casters 600M are employed to one or more of reduce an amount of differential torque applied by the drive wheels to effect autonomous transport vehicle travel along the transfer deck 130B and assist in aligning the caster wheels 610 with their nominal trailing position to minimize scrubbing of the caster wheels 610 on the travel surface 395 (FIGS. 3A and 3B). Here, the controller 1220 is configured to position the castering assistance motors 670 so as to bias a respective one of the at least one caster wheel 250 against castering and maintain the at least one caster wheel 250 in a predetermined steady state position (e.g., to effect travel of the autonomous transport vehicle 110 along a substantially straight line travel path or along an arcuate travel path) with the autonomous transport vehicle 110 in motion.

Referring to FIGS. 2, 3B, and 6, in an exemplary operation of autonomous transport vehicle 110 travel on the transfer deck 130B, the controller 1220 independently controls each of the motorized casters 600M (e.g., casters 250A, 250B) so that the wheel 610A, 610B (similar to caster wheel 610) of the caster wheels 250A, 250B is rotated to a zero-scrub angle δ1, δ2. The zero-scrub angle δ1, δ2 is the rotation angle about the caster pivot axis 691 that results in the wheel 610A, 610B pivoting about its contact patch with the travel surface, substantially without lateral friction forces induced on the wheel 610A, 610B by the travel surface) given a current/present angle of the caster wheel 610A, 610B (as measured by, e.g., feedback device 681 for any given instant of time at which the angle measurement is employed by controller 1220 for controlling the angle σ1, σ2 of the caster wheel 610A, 610B) and a desired velocity vector of the autonomous transport vehicle 110 (e.g., a rotation angle of the caster wheel 610A, 610B about a respective caster pivot axis 691, at which rotation angle substantially zero lateral frictional forces—substantially zero scrub—are exerted on the caster wheel by a travel surface along which the caster wheel traverses). As described in greater detail herein, the zero-scrub angle δ1, δ2 is a predetermined skew orientation of the at least one caster wheel 250 that is employed by the controller 1220 as a feed-forward term to drive rotation of each wheel 610A, 610B towards the respective zero-scrub angle δ1, δ2 while balancing an amount of steering torque τc. It is noted that where sufficient traction exits between the caster wheel 610A, 610B and the travel surface 395 (FIGS. 3A and 3B), the direction of torque τc (FIG. 5) for turning the caster wheel 610A, 610B is generally in the same direction as the torque for steering the autonomous transport vehicle 110; however, in other aspects there may be instances where the direction of torque τc (FIG. 5) for turning the caster wheel 610A, 610B is in an opposite direction as the torque for steering the autonomous transport vehicle 110.

As can be seen in FIG. 6, the zero-scrub angle δ1, δ2 for the different caster wheels 250A, 250B and the torque τc applied to the different caster wheels 250A, 250B may be different for any given turn radius R of the autonomous transport vehicle 110; however, at least the zero-scrub angle δ1, δ2 may be the same for the different caster wheels 250A, 250B with the autonomous transport vehicle 110 travelling along a substantially straight line path. Here, the controller 1220 independently calculates and controls the scrub angle for each of the caster wheels 610A, 610B. It is noted that at a steady state (e.g., a constant turn radius R (path) and constant velocity along the path (trajectory)) the zero-scrub angle δ1, δ2 is substantially perpendicular to the line from the caster wheel pivot point 941 and a center RC of the turn radius R (again noting that the turn radius R is measured or otherwise defined from the origin 900 of the autonomous transport vehicle 110. Here, the controller 1220 is configured to apply the castering assistance torque τc, with the motor 670, to the at least one caster wheel 250 biasing the at least one caster wheel 250 in a castering direction (e.g., as shown in FIGS. 5 and 6) to the predetermined skew orientation/zero-scrub angle δ1, δ2 of the at least one caster wheel 250, which predetermined skew orientation/zero-scrub angle δ1, δ2 forms a bias angle (see also angles σ1, σ2) between the at least one caster wheel 250, in the predetermined skew orientation, and the axis of symmetry LAX of the autonomous transport vehicle.

Referring to FIGS. 2, 3B, 5, 6, and 7, as described above, the autonomous transport vehicle 110 is a non-holonomic differential-drive type robot that has but two degrees of freedom (e.g., with respect to travel of the autonomous transport vehicle along a travel surface and exclusive of case unit pick/place features of the autonomous transport vehicle 110). Here the two degrees of freedom for travel of the autonomous transport vehicle 110 along a travel surface 395 (FIGS. 3A and 3B) are linear and rotational motion, which two degrees of freedom correspond to two dimensions of travel motion forces (e.g., net (or summation of) drive motion torque τd and net (or summation of) drive motion force fd) applied at the origin 900 by the motors 261M of the drive wheels 260A, 260B and the motors 670 of the motorized casters 600M. It is noted that torque τb generated by the motorized casters 600M may be a component of (i.e., supplements) the net drive motion torque τd and the force fb generated by the motorized casters 600M may be a component of (i.e., supplements) the net drive motion force fd (see FIG. 5). With the two drive wheels 260A, 260B, and but two dimensions of travel motion forces, the drive motor 261M torque for each drive wheel 260A, 260B is defined by a desired force and desired moment to move the autonomous transport vehicle 110 along a predetermined travel path; however, in accordance with aspects of the disclosed embodiment the motorized casters 600M provide the autonomous transport vehicle 110 with four motors (rather than the conventional two motors) that contribute to the net drive motion force fd and the net drive motion torque τd effecting an under-constrained drive system of the autonomous transport vehicle 110. Here, the generation of the drive motion force fd and torque τd is distributed over the four motors 670, 261M of the drive wheels 260A, 260B and the caster wheels 250A, 250B. This provides for the motors 261M of the drive wheels 260A, 260B to be optimized (e.g., is size, power, etc. as described herein) for linear inertial changes of the autonomous transport vehicle 110 motion rather than being configured for generating moments (e.g., about the origin 900) of the autonomous transport vehicle 110 that induce castering of the at least one caster wheels 250 (e.g., the motors 261M do not have to be sized to generate moments about the origin 900 that effect castering of the caster wheels 250, which moments are greater than those moments needed to effect only linear inertial changes in autonomous transport vehicle motion).

Figure 7:
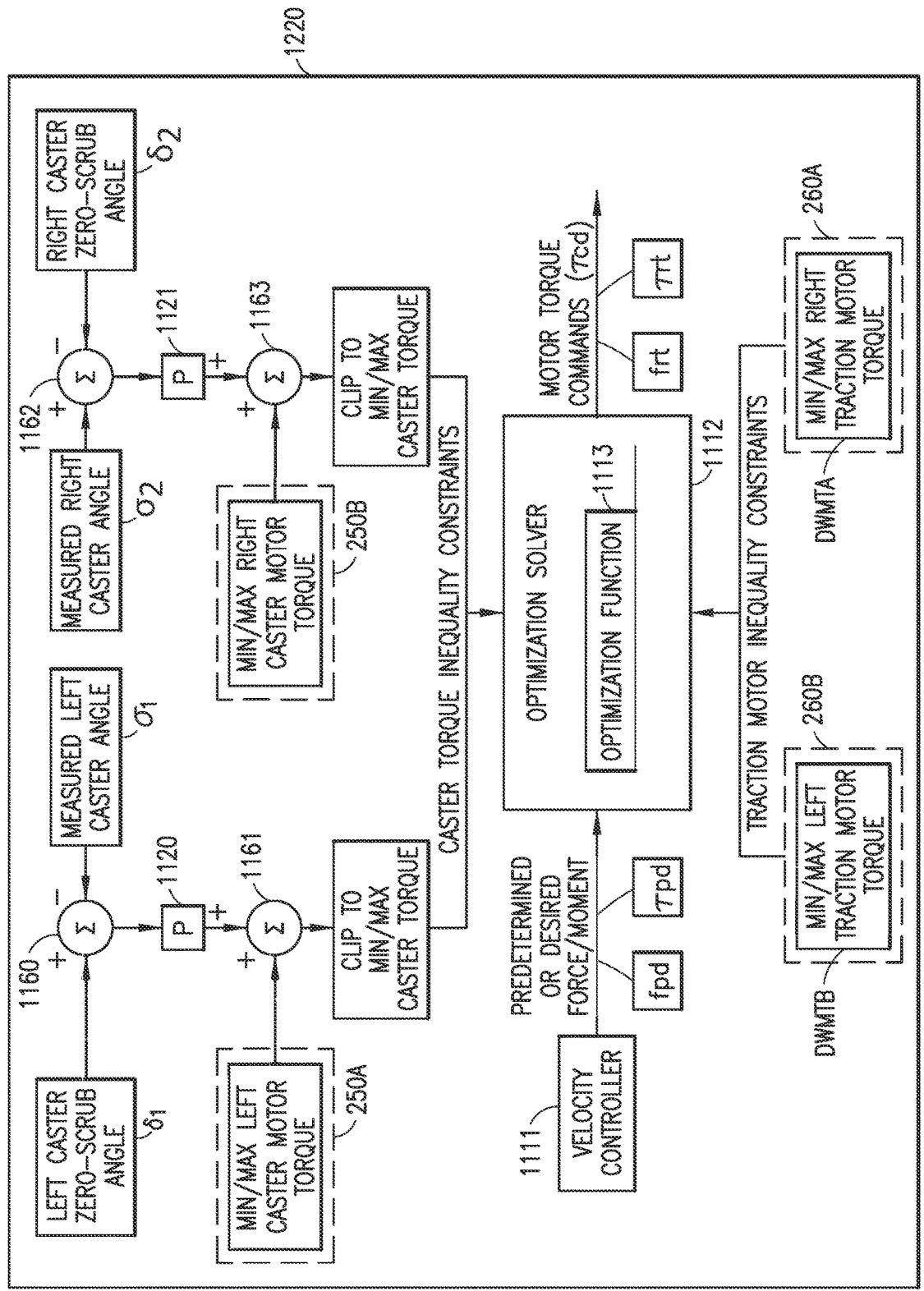
FIG. 7 is a schematic illustration of an exemplary control architecture of the autonomous transport vehicle of FIG. 2 in accordance with aspects of the disclosed embodiment.

FIG. 7 is an exemplary control architecture of the autonomous transport vehicle 110 that effects one or more of substantially zero-scrubbing of the caster wheels 610A, 610B and a dynamic distribution of the drive motion force fd and torque τd over the four motors 670, 261M of the drive wheels 260A, 260B and the caster wheels 250A, 250B. In accordance with the aspects of the disclosed embodiment, the controller 1220 includes any suitable velocity controller 1111 and optimization solver 1112. The velocity controller 1111 is configured to, based on a commanded task (e.g., case unit transport task, traverse task, etc.), determine and output (e.g., to the optimization solver 1112) a predetermined drive motion force fpd and/or predetermined drive motion moment τpd for moving the autonomous transport vehicle along a travel path for completing the commanded task. The optimization solver 1112 is configured to, using feedback from one or more of the caster wheels 250A, 250B and drive wheels 260A, 260B minimize an optimization function 1113 such that the net drive motion force fd and the net drive motion torque τd from the four motors 261M, 670 of the caster wheels 250A, 250B and drive wheels 260A, 260B meets constraints defined by the output of the velocity controller 1111 and the maximum available torque from each of the motors 261M, 670. The optimization function 1113 may any suitable optimization function including, but not limited to, a balancing of the forces/moments fd, τd between the four motors 261M, 670, minimizing the maximum torque applied to any given wheel 260A, 260B, 610A, 610B, and/or minimizing energy waste due to heat loss in the motor windings (i.e., minimize the sum of $I^2R$, where I is current and R is resistance) across the four motors 261M, 670.

The above-noted constraints may be expressed as linear equality or inequality constraints, and the optimization function 1113 may correspondingly be quadratic. Here, the optimization solver is configured with, for example, any suitable quadratic programming solution method; however, in other aspects any suitable solution method for effecting a determination of motor torque commands for effecting traverse of the autonomous transport vehicle 110.

To effect the substantially zero scrubbing of the wheels 610A, 610B of the caster wheels 250A, 250B, the feed-forward control described herein is employed to provide feedback/input to the optimization solver 1112. Here, the controller 1220 calculates the zero-scrub angle δ1, δ2 for each of the caster wheels 250A, 250B in the manner described above for the commanded travel path and velocity of the autonomous transport vehicle 110. The controller 1220 also receives the current/present angle σ1, σ2 (as measured by, e.g., feedback device 681) for each of the wheels 610A, 610B (see FIG. 5). The controller 1220 is configured to determine a difference between the zero-scrub angle δ1 and the current angle σ1 of the caster wheel 610A to determine a caster angle error 1160. The caster angle error 1160 is processed through a proportional gain 1120 of the controller 1220, where the output of the proportional gain is employed by the controller 1220 to constrain an available amount of torque for the motor 670 of the caster 250A so as to determine constrained caster torque 1161. It is noted that as the caster angle error 1160 increases, the caster torque of caster 250A is further constrained to push the caster wheel 610A towards the zero-scrub angle δ1. Similarly, the controller 1220 is configured to determine a difference between the zero-scrub angle δ2 and the current angle σ2 of the caster wheel 610B to determine a caster angle error 1162. The caster angle error 1162 is processed through a proportional gain 1121 (which may be same as or different from proportional gain 1121) of the controller 1220, where the output of the proportional gain is employed by the controller 1220 to constrain an available amount of torque for the motor 670 of the caster 250B so as to determine constrained caster torque 1163. It is noted that as the caster angle error 1162 increases, the caster torque of the caster 250B is further constrained to push the caster wheel 610B towards the zero-scrub angle δ2.

Generally, where traction is maintained between the wheels 610A, 610B and the travel surface 395 (see FIGS. 3A and 3B), the constrained caster torque 1161, 1163 does not create additional constraints on the optimization solver 1112, because the sign (i.e., direction) of the torque needed to maintain the zero-scrub angle δ1, δ2 is the same sign (i.e., direction) as the steering torque. Where traction between the caster wheels 610A, 610B and the travel surface 395 is lost, the caster angle error 1160, 1162 increases and can be of opposite sign (e.g., direction) than the steering torque. Here, the torque is redistributed from the casters 250A, 250B to the drive wheels 260A, 260B so that the predetermined drive motion force fpd and/or predetermined drive motion moment τpd are satisfied, while also pushing/driving the caster wheels 610A, 610B back to the zero-scrub angle δ1, δ2. It is noted that where the caster angle error 1160, 1162 is of opposite sign (e.g., direction) than the steering torque, the proportional gain 1120, 1121 is configured to effect a balance between obtainment of the zero-scrub angle δ1, δ2 and obtainment of torque distribution between the wheels 610A, 610B, 250A, 250B. Here a dynamic redistribution of drive motion force and or drive motion moment between the casters 250A, 250B and the drive wheels 260A, 260B provides for caster-heavy steering, while still providing for zero-radius turns with the differential drive of the drive wheels 260A, 260B.

With the predetermined force fpd, the predetermined moment τpd, motor torques DWMTA, DWMTB from drive wheels 260A, 260B (determined by any suitable sensors in communication with the controller 1220), and the constrained caster torques 1161, 1163 known to the optimization solver 1112, the optimization solver determines present/real-time motor commands (e.g., present force frt and present moment τrt) for driving the motors 670 of one or more of the casters 250A, 250B and/or motors 261M of one or more of the drive wheels 260A, 260B so as to effect travel of the autonomous transport vehicle 110 along a predetermined path and having a predetermined kinematic state. In one or more aspects, the constrained caster torques 1161, 1163 may be larger than a maximum torque available to the caster 250A, 250B, in which case the constrained caster torques 1161, 1163 are clipped to the maximum torque available. Similarly, the constrained caster torques 1161, 1163 may be less than a minimum torque available to the caster 250A, 250B, in which case the constrained caster torques 1161, 1163 are clipped to the minimum available torque. As described herein, the above-noted control is performed in a real-time loop so that the motor torque commands (e.g., present force frt and present moment τrt) are updated in real-time so as to maintain the caster wheels 610A, 610B at the respective zero-scrub angle δ1, δ2 with the autonomous transport vehicle 110 travelling along a substantially straight and/or curved path(s).

Figure 8:
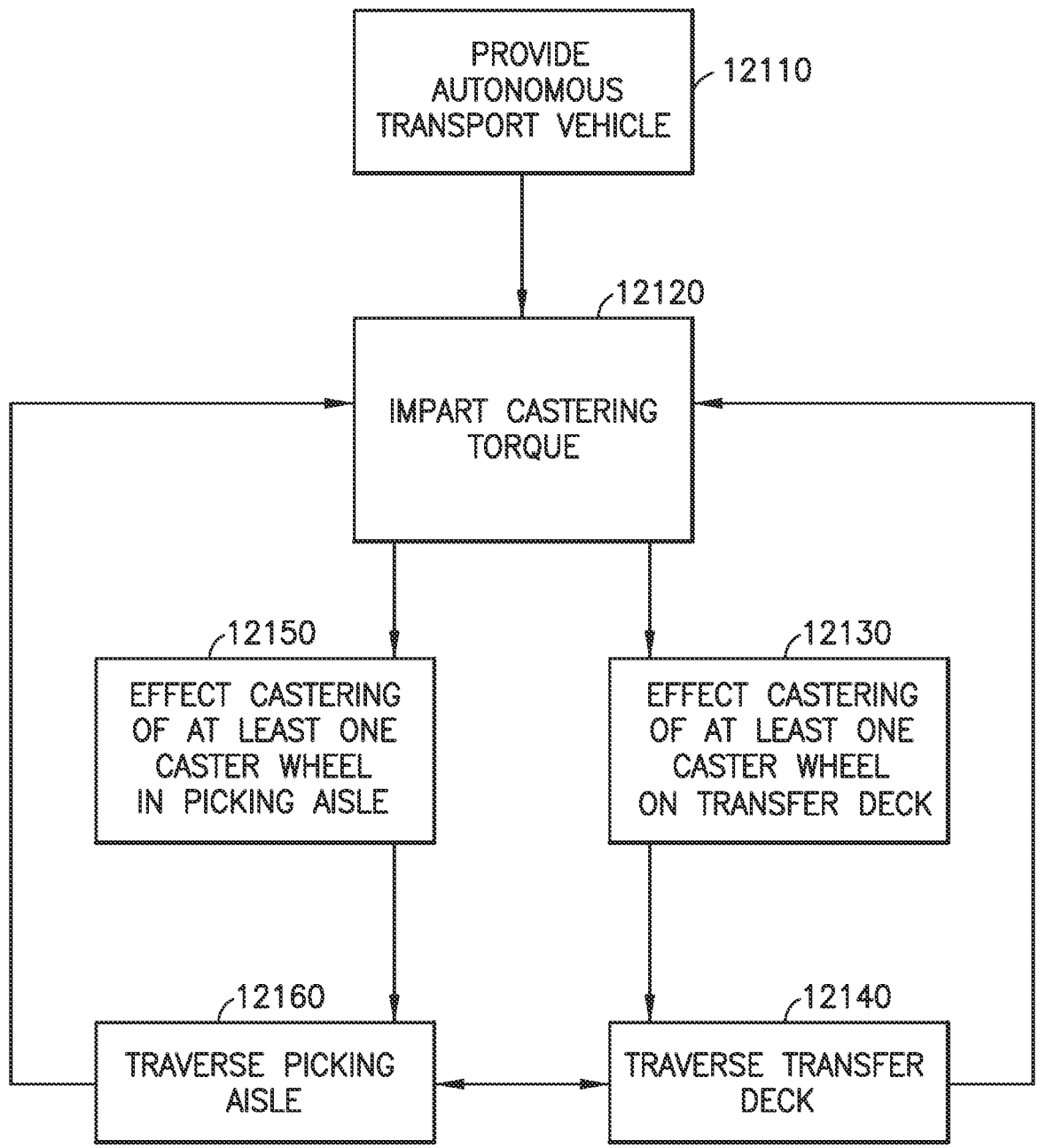
FIG. 8 is an exemplary flow diagram of a method in accordance with aspects of the disclosed embodiment.

Referring to FIG. 8 as well as to FIGS. 1, 2, 3B, 4, 5, 6, and 7 an exemplary method for driving an autonomous transport vehicle 110 in the storage and retrieval system 100 will be described in accordance with aspects of the disclosed embodiment. In the method the autonomous transport vehicle 110 is provided (FIG. 8, Block 12110). The autonomous transport vehicle 110 includes, as described herein, a frame 200, a controller 1220, at least two independently driven drive wheels 260A, 260B mounted to the frame 200, and at least one caster wheel 250 mounted to the frame 200 and having a castering assistance motor 670. A castering assistance torque τc is imparted (FIG. 8, Block 12120), with the castering assistance motor 670 engaged to the at least one caster wheel 250, so as to assist castering (e.g., rotation of the wheel 610 about the caster pivot axis 691) of the at least one caster wheel 250. As described herein, the autonomous transport vehicle 110 traverses both the transfer deck 130B and the picking aisles 130A. With the autonomous transport vehicle 110 on the transfer deck 130B, the controller 1220 effects castering of the at least one caster wheel 250 (FIG. 8, Block 12130), via a combination of vehicle yaw, generated by differential torque from the at least two independently driven drive wheels 260A, 260B, and castering assistance torque τc from the castering assistance motor 670. Here, the castering of the at least one caster wheel 250 is performed with the autonomous transport vehicle 110 in motion with a predetermined kinematic state; however, the controller 1220 may also effect application of the castering assistance torque τc to the at least one caster wheel 250 biasing the at least one caster wheel in a castering direction to the predetermined skew orientation δ1, δ2 with the autonomous transport vehicle 110 at rest (such as to initiate a turn or arcuate path of motion from rest as described herein). The autonomous transport vehicle 110 traverses the transfer deck 130B (FIG. 8, Block 12140) under control of controller 1220 where directional changes of the autonomous transport vehicle on the transfer deck are effected at least by application of castering assistance torque τc to the at least one caster wheel 250.

With traverse of the autonomous transport vehicle 110 along the transfer deck 130B, the controller 1220, in one or more aspects, positions the castering assistance motor 670 so as to bias the at least one caster wheel 250 against castering and maintains the at least one caster wheel 250 in a predetermined steady state position with the autonomous transport vehicle 110 in motion along the transfer deck 130B so as to maintain traverse of the autonomous transport vehicle 110 along a predetermined path with a predetermined kinematic state (e.g., velocity vector). The controller 1220 effects application of the castering assistance torque τc (as described herein with the autonomous transport vehicle 110 at rest or in motion) to the at least one caster wheel 250 biasing the at least one caster wheel 250 in a castering direction to a predetermined skew orientation δ1, δ2 of the at least one caster wheel 250, which predetermined skew orientation δ1, δ2 forms a bias angle (see angles σ1, σ2) between the at least one caster wheel 250 (e.g., the wheel 610), in the predetermined orientation, and an axis of symmetry LAX of the autonomous transport vehicle 110.

As described herein, with traverse of the autonomous transport vehicle 110 along the transfer deck 130B, the controller determines, independently for each respective caster wheel 250A, 250B, the commanded castering assistance torque τc for each respective caster wheel 250A, 250B, of the at least one caster wheel 250, so as to effect substantially scrubless castering of each respective caster wheel 250A, 250B substantially independent of vehicle path and kinematic state. As illustrated in FIG. 6 and as described above, the controller 1220 determines, independently for each respective caster wheel 250A, 250B, the commanded castering assistance torque τcd for each respective caster wheel 250A, 250B to effect substantially scrubless castering of each respective caster wheel 250A, 250B, wherein castering assistance torque respectively commanded for each corresponding caster wheel varies between corresponding caster wheels 250A, 250B based on turn radius.

With the autonomous transport vehicle 110 in a picking aisle, the controller 1220 effects castering of the at least one caster wheel 250 (FIG. 8, Block 12150), via a combination of linear vehicle motion, generated by torque from the at least two independently driven drive wheels 260A, 260B, and castering assistance torque τc from the castering assistance motor 670. Here, the castering of the at least one caster wheel 250 is performed with the autonomous transport vehicle 110 making a change in direction within the picking aisle (such as from travel in direction 810 to travel in direction 820—see FIG. 4). The castering of the at least one caster wheel 250 is performed at least in part with the autonomous transport vehicle in motion with a predetermined kinematic state (e.g., travelling along the picking aisle with a predetermined velocity vector). Here, the controller 1220 initiate castering of the at least one caster wheel 250 by effecting application of the castering assistance torque τc to the at least one caster wheel 250 biasing the at least one caster wheel in a castering direction (e.g., towards a center of the picking aisle 130A as described herein) with the autonomous transport vehicle 110 at rest (such as to initiate the change in direction within the picking aisle 130A). The autonomous transport vehicle 110 traverses the picking aisle 130A (FIG. 8, Block 12160) under control of controller 1220 as described herein with, in one aspect, substantial no castering assistance torque τc being applied to the at least one caster wheel 250 during traverse along the picking aisle; while in other aspects, a castering assistance torque τc being applied to the at least one caster wheel 250 so as to bias the at least one caster wheel 250 against castering and maintain the at least one caster wheel 250 in a predetermined steady state position with the autonomous transport vehicle 110 in motion along the picking aisle 130A.

In accordance with one or more aspects of the disclosed embodiment an autonomous transport vehicle for transporting items in a storage and retrieval system is provided. The autonomous transport vehicle comprises: a frame; a controller; at least two independently driven drive wheels mounted to the frame; and at least one caster wheel mounted to the frame and having a castering assistance motor that engages the at least one caster wheel so as to impart castering assistance torque to the at least one caster wheel assisting castering of the at least one caster wheel; wherein the controller is communicably connected to the castering assistance motor and configured to effect via a combination of vehicle yaw, generated by differential torque from the at least two independently driven drive wheels, and castering assistance torque from the castering assistance motor, castering of the at least one caster wheel with the autonomous transport vehicle in motion with a predetermined kinematic state.

In accordance with one or more aspects of the disclosed embodiment the castering assistance motor is configured so that a maximum castering assistance torque is a motor rated torque of the castering assistance motor, and commanded castering assistance torque is configured wherein resistance from castering scrub at each predetermined kinematic state is substantially negated so as to effect substantially scrubless castering along and throughout each vehicle path via the commanded castering assistance torque, substantially independent of vehicle path and kinematic state.

In accordance with one or more aspects of the disclosed embodiment the commanded castering assistance torque for each respective caster wheel, of the at least one caster wheel, is determined independently for each respective caster wheel so as to effect substantially scrubless castering of each respective caster wheel substantially independent of vehicle path and kinematic state.

In accordance with one or more aspects of the disclosed embodiment the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

In accordance with one or more aspects of the disclosed embodiment the commanded castering assistance torque substantially negates castering resistance imparted to the at least one caster wheel from castering scrub.

In accordance with one or more aspects of the disclosed embodiment the commanded castering assistance torque substantially negates resistance from castering scrub imparted against vehicle yaw moment generated by the differential torque from the at least two independently driven drive wheels.

In accordance with one or more aspects of the disclosed embodiment the controller is configured to position the castering assistance motor so as to bias the at least one caster wheel against castering and maintain the at least one caster wheel in a predetermined steady state position with the autonomous transport vehicle in motion.

In accordance with one or more aspects of the disclosed embodiment the controller is configured to apply the castering assistance torque, with the castering assistance motor, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

In accordance with one or more aspects of the disclosed embodiment the controller is configured to apply the castering assistance torque, with the castering assistance motor, to the at least one caster wheel biasing the at least one caster wheel in a castering direction to the predetermined skew orientation with the autonomous transport vehicle at rest.

In accordance with one or more aspects of the disclosed embodiment the at least one caster wheel has a caster mount housing and the castering assistance motor is a frameless motor, the frameless motor being integrated in the caster mount housing.

In accordance with one or more aspects of the disclosed embodiment the at least one caster wheel has a caster mount housing, the caster mount housing houses the castering assistance motor, a stator of the caster assistance motor being disposed against and supported by the caster mount housing, and a rotor of the castering assistance motor being disposed against a caster pivot shaft of the at least one caster wheel, the caster pivot shaft pivotally joining the at least one caster wheel to the caster mount housing.

In accordance with one or more aspects of the disclosed embodiment the caster assistance motor is at least one of a servo motor and a stepper motor.

In accordance with one or more aspects of the disclosed embodiment the castering assistance motor effects optimization of drive wheel motors of the at least two independently driven drive motors so that the drive wheel motors are optimized to effect linear inertial changes in autonomous transport vehicle motion.

In accordance with one or more aspects of the disclosed embodiment an autonomous transport vehicle for transporting items in a storage and retrieval system is provided. The autonomous transport vehicle comprises: a frame; a controller; at least two independently driven drive wheels mounted to the frame; and at least one caster wheel, of a non-holonomic steering system, is mounted to the frame and having a castering assistance motor that engages the at least one caster wheel so as to impart castering assistance torque to the at least one caster wheel assisting castering of the at least one caster wheel; wherein the controller is communicably connected to the castering assistance motor and configured to effect, via castering assistance torque from the castering assistance motor assisting castering input from vehicle yaw generated by differential torque from the at least two independently driven wheels, substantially scrubless castering of the at least one caster wheel with the autonomous transport vehicle in motion with a predetermined kinematic state.

In accordance with one or more aspects of the disclosed embodiment the controller is configured to determine the castering assistance torque as a supplement torque supplementing castering input to the at least one caster wheel, from vehicle yaw, to effect scrubless castering of the at least one caster wheel.

In accordance with one or more aspects of the disclosed embodiment the castering assistance motor is configured so that a maximum castering assistance torque is a motor rated torque of the castering assistance motor, and commanded castering assistance torque is configured wherein resistance from castering scrub at each predetermined kinematic state is substantially negated so as to effect the substantially scrubless castering along and throughout each vehicle path via the commanded castering assistance torque, substantially independent of vehicle path and kinematic state.

In accordance with one or more aspects of the disclosed embodiment the commanded castering assistance torque for each respective caster wheel, of the at least one caster wheel, is determined independently for each respective caster wheel so as to effect substantially scrubless castering of each respective caster wheel substantially independent of vehicle path and kinematic state.

In accordance with one or more aspects of the disclosed embodiment the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

In accordance with one or more aspects of the disclosed embodiment the commanded castering assistance torque substantially negates castering resistance imparted to the at least one caster wheel from castering scrub.

In accordance with one or more aspects of the disclosed embodiment the commanded castering assistance torque substantially negates resistance from castering scrub imparted against vehicle yaw moment generated by the differential torque from the at least two independently driven drive wheels.

In accordance with one or more aspects of the disclosed embodiment the controller is configured to position the castering assistance motor so as to bias the at least one caster wheel against castering and maintain the at least one caster wheel in a predetermined steady state position with the autonomous transport vehicle in motion.

In accordance with one or more aspects of the disclosed embodiment the controller is configured to apply the castering assistance torque, with the castering assistance motor, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

In accordance with one or more aspects of the disclosed embodiment the controller is configured to apply the castering assistance torque, with the castering assistance motor, to the at least one caster wheel biasing the at least one caster wheel in a castering direction to the predetermined skew orientation with the autonomous transport vehicle at rest.

In accordance with one or more aspects of the disclosed embodiment the at least one caster wheel has a caster mount housing and the castering assistance motor is a frameless motor, the frameless motor being integrated in the caster mount housing.

In accordance with one or more aspects of the disclosed embodiment the at least one caster wheel has a caster mount housing, the caster mount housing houses the castering assistance motor, a stator of the caster assistance motor being disposed against and supported by the caster mount housing, and a rotor of the castering assistance motor being disposed against a caster pivot shaft of the at least one caster wheel, the caster pivot shaft pivotally joining the at least one caster wheel to the caster mount housing.

In accordance with one or more aspects of the disclosed embodiment the caster assistance motor is at least one of a servo motor and a stepper motor.

In accordance with one or more aspects of the disclosed embodiment the castering assistance motor effects optimization of drive wheel motors of the at least two independently driven drive motors so that the drive wheel motors are optimized to effect linear inertial changes in autonomous transport vehicle motion.

In accordance with one or more aspects of the disclosed embodiment an autonomous transport vehicle for transporting items in a storage and retrieval system is provided. The autonomous transport vehicle comprises: a frame; a controller; at least two independently driven drive wheels mounted to the frame; and at least one caster wheel mounted to the frame and having a castering assistance motor that engages the at least one caster wheel so as to impart castering assistance torque to the at least one caster wheel assisting castering of the at least one caster wheel; wherein the controller is communicably connected to the castering assistance motor and configured to effect castering of the at least one caster wheel with the autonomous transport vehicle in motion with a predetermined kinematic state via a combination of vehicle yaw, generated by differential torque from the at least two independently driven drive wheels, and castering assistance torque, from the castering assistance motor, the castering assistance torque being developed substantially negating resistance from castering scrub in each predetermined kinematic state of the autonomous transport vehicle.

In accordance with one or more aspects of the disclosed embodiment the controller is configured to determine the castering assistance torque as a supplement torque supplementing castering input to the at least one caster wheel, from vehicle yaw, to effect scrubless castering of the at least one caster wheel.

In accordance with one or more aspects of the disclosed embodiment the castering assistance motor is configured so that a maximum castering assistance torque is a motor rated torque of the castering assistance motor, and commanded castering assistance torque is configured wherein the resistance from the castering scrub at each predetermined kinematic state is substantially negated so as to effect the substantially scrubless castering along and throughout each vehicle path via the commanded castering assistance torque, substantially independent of vehicle path and kinematic state.

In accordance with one or more aspects of the disclosed embodiment the commanded castering assistance torque for each respective caster wheel, of the at least one caster wheel, is determined independently for each respective caster wheel so as to effect substantially scrubless castering of each respective caster wheel substantially independent of vehicle path and kinematic state.

In accordance with one or more aspects of the disclosed embodiment the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

In accordance with one or more aspects of the disclosed embodiment the commanded castering assistance torque substantially negates castering resistance imparted to the at least one caster wheel from the castering scrub.

In accordance with one or more aspects of the disclosed embodiment the commanded castering assistance torque substantially negates resistance from the castering scrub imparted against vehicle yaw moment generated by the differential torque from the at least two independently driven drive wheels.

In accordance with one or more aspects of the disclosed embodiment the controller is configured to position the castering assistance motor so as to bias the at least one caster wheel against castering and maintain the at least one caster wheel in a predetermined steady state position with the autonomous transport vehicle in motion.

In accordance with one or more aspects of the disclosed embodiment the controller is configured to apply the castering assistance torque, with the castering assistance motor, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

In accordance with one or more aspects of the disclosed embodiment the controller is configured to apply the castering assistance torque, with the castering assistance motor, to the at least one caster wheel biasing the at least one caster wheel in a castering direction to the predetermined skew orientation with the autonomous transport vehicle at rest.

In accordance with one or more aspects of the disclosed embodiment the at least one caster wheel has a caster mount housing and the castering assistance motor is a frameless motor, the frameless motor being integrated in the caster mount housing.

In accordance with one or more aspects of the disclosed embodiment the at least one caster wheel has a caster mount housing, the caster mount housing houses the castering assistance motor, a stator of the caster assistance motor being disposed against and supported by the caster mount housing, and a rotor of the castering assistance motor being disposed against a caster pivot shaft of the at least one caster wheel, the caster pivot shaft pivotally joining the at least one caster wheel to the caster mount housing.

In accordance with one or more aspects of the disclosed embodiment the caster assistance motor is at least one of a servo motor and a stepper motor.

In accordance with one or more aspects of the disclosed embodiment the castering assistance motor effects optimization of drive wheel motors of the at least two independently driven drive motors so that the drive wheel motors are optimized to effect linear inertial changes in autonomous transport vehicle motion.

In accordance with one or more aspects of the disclosed embodiment an autonomous transport vehicle for transporting items in a storage and retrieval system is provided. The autonomous transport vehicle comprises: a frame; a controller; at least two independently driven drive wheels mounted to the frame; and at least one caster wheel mounted to the frame and having a castering assistance electromagnetic actuator that engages the at least one caster wheel so as to impart a bias force to the at least one caster wheel at each castering position of the at least one caster wheel; wherein the controller is communicably connected to the castering assistance electromagnetic actuator and configured to effect castering of the at least one caster wheel with the autonomous transport vehicle in motion with a predetermined kinematic state via a combination of vehicle yaw, generated by differential torque from the at least two independently driven drive wheels, and bias force, from the castering assistance electromagnetic actuator, that is commanded so as to bias the at least one caster wheel to a corresponding castering position that substantially negates resistance from castering scrub in each predetermined kinematic state of the autonomous transport vehicle.

In accordance with one or more aspects of the disclosed embodiment the commanded bias force substantially negates castering resistance imparted to the at least one caster wheel from the castering scrub.

In accordance with one or more aspects of the disclosed embodiment the commanded bias force substantially negates resistance from castering scrub imparted against vehicle yaw moment generated by the differential torque from the at least two independently driven drive wheels.

In accordance with one or more aspects of the disclosed embodiment the controller is configured to determine a castering assistance torque of the castering assistance electromagnetic actuator as a supplement torque supplementing castering input to the at least one caster wheel, from the vehicle yaw, to effect scrubless castering of the at least one caster wheel.

In accordance with one or more aspects of the disclosed embodiment the castering assistance electromagnetic actuator is configured so that a maximum castering assistance torque is a motor rated torque of the castering assistance electromagnetic actuator, and commanded castering assistance torque is configured wherein the resistance from the castering scrub at each predetermined kinematic state is substantially negated so as to effect the substantially scrubless castering along and throughout each vehicle path via the commanded castering assistance torque, substantially independent of vehicle path and kinematic state.

In accordance with one or more aspects of the disclosed embodiment the commanded castering assistance torque for each respective caster wheel, of the at least one caster wheel, is determined independently for each respective caster wheel so as to effect substantially scrubless castering of each respective caster wheel substantially independent of vehicle path and kinematic state.

In accordance with one or more aspects of the disclosed embodiment the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

In accordance with one or more aspects of the disclosed embodiment the controller is configured to position the castering assistance electromagnetic actuator so as to bias the at least one caster wheel against castering and maintain the at least one caster wheel in a predetermined steady state position with the autonomous transport vehicle in motion.

In accordance with one or more aspects of the disclosed embodiment the controller is configured to apply a castering assistance torque, with the castering assistance electromagnetic actuator, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

In accordance with one or more aspects of the disclosed embodiment the controller is configured to apply the castering assistance torque, with the castering assistance electromagnetic actuator, to the at least one caster wheel biasing the at least one caster wheel in a castering direction to the predetermined skew orientation with the autonomous transport vehicle at rest.

In accordance with one or more aspects of the disclosed embodiment the at least one caster wheel has a caster mount housing and the castering assistance electromagnetic actuator is a frameless motor, the frameless motor being integrated in the caster mount housing.

In accordance with one or more aspects of the disclosed embodiment the at least one caster wheel has a caster mount housing, the caster mount housing houses the castering assistance electromagnetic actuator, a stator of the caster assistance electromagnetic actuator being disposed against and supported by the caster mount housing, and a rotor of the castering assistance electromagnetic actuator being disposed against a caster pivot shaft of the at least one caster wheel, the caster pivot shaft pivotally joining the at least one caster wheel to the caster mount housing.

In accordance with one or more aspects of the disclosed embodiment the caster assistance electromagnetic actuator is at least one of a servo motor and a stepper motor.

In accordance with one or more aspects of the disclosed embodiment the castering assistance motor effects optimization of drive wheel motors of the at least two independently driven drive motors so that the drive wheel motors are optimized to effect linear inertial changes in autonomous transport vehicle motion.

In accordance with one or more aspects of the disclosed embodiment a method for driving an autonomous transport vehicle in a storage and retrieval system is provided. The method comprises: providing an autonomous transport vehicle having a frame, a controller, at least two independently driven drive wheels mounted to the frame, and at least one caster wheel mounted to the frame and having a castering assistance motor; imparting castering assistance torque, with the castering assistance motor engaged to the at least one caster wheel, so as to assist castering of the at least one caster wheel; and effecting, with the controller communicably connected to the castering assistance motor, via a combination of vehicle yaw, generated by differential torque from the at least two independently driven drive wheels, and castering assistance torque from the castering assistance motor, castering of the at least one caster wheel with the autonomous transport vehicle in motion with a predetermined kinematic state.

In accordance with one or more aspects of the disclosed embodiment a maximum castering assistance torque of the castering assistance motor is a motor rated torque of the castering assistance motor, and resistance from castering scrub at each predetermined kinematic state is substantially negated by commanded castering assistance torque so as to effect substantially scrubless castering along and throughout each vehicle path via the commanded castering assistance torque, substantially independent of vehicle path and kinematic state.

In accordance with one or more aspects of the disclosed embodiment the method further comprises determining, independently for each respective caster wheel, the commanded castering assistance torque for each respective caster wheel, of the at least one caster wheel, so as to effect substantially scrubless castering of each respective caster wheel substantially independent of vehicle path and kinematic state.

In accordance with one or more aspects of the disclosed embodiment the method further comprises determining, independently for each respective caster wheel, the commanded castering assistance torque for each respective caster wheel, of the at least one caster wheel to effect substantially scrubless castering of each respective caster wheel, wherein castering assistance torque respectively commanded for each corresponding caster wheel varies between corresponding caster wheels of the at least one caster wheel based on turn radius.

In accordance with one or more aspects of the disclosed embodiment the commanded castering assistance torque substantially negates castering resistance imparted to the at least one caster wheel from castering scrub.

In accordance with one or more aspects of the disclosed embodiment the commanded castering assistance torque substantially negates resistance from castering scrub imparted against vehicle yaw moment generated by the differential torque from the at least two independently driven drive wheels.

In accordance with one or more aspects of the disclosed embodiment the method further comprises, positioning, with the controller, the castering assistance motor so as to bias the at least one caster wheel against castering and maintain the at least one caster wheel in a predetermined steady state position with the autonomous transport vehicle in motion.

In accordance with one or more aspects of the disclosed embodiment the method further comprises applying, under control of the controller, the castering assistance torque, with the castering assistance motor, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

In accordance with one or more aspects of the disclosed embodiment the method further comprises applying, under control of the controller, the castering assistance torque, with the castering assistance motor, to the at least one caster wheel biasing the at least one caster wheel in a castering direction to the predetermined skew orientation with the autonomous transport vehicle at rest.

In accordance with one or more aspects of the disclosed embodiment the at least one caster wheel has a caster mount housing and the castering assistance motor is a frameless motor, the frameless motor being integrated in the caster mount housing.

In accordance with one or more aspects of the disclosed embodiment the at least one caster wheel has a caster mount housing, the caster mount housing houses the castering assistance motor, a stator of the caster assistance motor being disposed against and supported by the caster mount housing, and a rotor of the castering assistance motor being disposed against a caster pivot shaft of the at least one caster wheel, the caster pivot shaft pivotally joining the at least one caster wheel to the caster mount housing.

In accordance with one or more aspects of the disclosed embodiment the caster assistance motor is at least one of a servo motor and a stepper motor.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous transport vehicle for transporting items in a storage and retrieval system, the autonomous transport vehicle comprising:
   a frame;
   a controller;
   at least two independently driven drive wheels mounted to the frame; and
   at least one caster wheel mounted to the frame and having a castering assistance motor that engages the at least one caster wheel so as to impart castering assistance torque to the at least one caster wheel assisting castering of the at least one caster wheel;
   wherein the controller is communicably connected to the castering assistance motor and configured to effect via a combination of vehicle yaw, generated by differential torque from the at least two independently driven drive wheels, and castering assistance torque from the castering assistance motor, castering of the at least one caster wheel with the autonomous transport vehicle in motion with a predetermined kinematic state.

2. The autonomous transport vehicle of claim 1, wherein the castering assistance motor is configured so that a maximum castering assistance torque is a motor rated torque of the castering assistance motor, and commanded castering assistance torque is configured wherein resistance from castering scrub at each predetermined kinematic state is substantially negated so as to effect substantially scrubless castering along and throughout each vehicle path via the commanded castering assistance torque, substantially independent of vehicle path and kinematic state.

3. The autonomous transport vehicle of claim 2, wherein the commanded castering assistance torque for each respective caster wheel, of the at least one caster wheel, is determined independently for each respective caster wheel so as to effect substantially scrubless castering of each respective caster wheel substantially independent of vehicle path and kinematic state.

4. The autonomous transport vehicle of claim 2, wherein the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

5. The autonomous transport vehicle of claim 2, wherein the commanded castering assistance torque substantially negates castering resistance imparted to the at least one caster wheel from castering scrub.

6. The autonomous transport vehicle of claim 2, wherein the commanded castering assistance torque substantially negates resistance from castering scrub imparted against vehicle yaw moment generated by the differential torque from the at least two independently driven drive wheels.

7. The autonomous transport vehicle of claim 1, wherein the controller is configured to position the castering assistance motor so as to bias the at least one caster wheel against castering and maintain the at least one caster wheel in a predetermined steady state position with the autonomous transport vehicle in motion.

8. The autonomous transport vehicle of claim 1, wherein the controller is configured to apply the castering assistance torque, with the castering assistance motor, to the at least one caster wheel biasing the at least one caster wheel in a castering direction to a predetermined skew orientation of the at least one caster wheel, which predetermined skew orientation forms a bias angle between the at least one caster wheel, in the predetermined orientation, and an axis of symmetry of the autonomous transport vehicle.

9. The autonomous transport vehicle of claim 8, wherein the controller is configured to apply the castering assistance torque, with the castering assistance motor, to the at least one caster wheel biasing the at least one caster wheel in a castering direction to the predetermined skew orientation with the autonomous transport vehicle at rest.

10. The autonomous transport vehicle of claim 1, wherein the at least one caster wheel has a caster mount housing and the castering assistance motor is a frameless motor, the frameless motor being integrated in the caster mount housing.

11. The autonomous transport vehicle of claim 1, wherein the at least one caster wheel has a caster mount housing, the caster mount housing houses the castering assistance motor, a stator of the caster assistance motor being disposed against and supported by the caster mount housing, and a rotor of the castering assistance motor being disposed against a caster pivot shaft of the at least one caster wheel, the caster pivot shaft pivotally joining the at least one caster wheel to the caster mount housing.

12. The autonomous transport vehicle of claim 1, wherein the caster assistance motor is at least one of a servo motor and a stepper motor.

13. The autonomous transport vehicle of claim 1, wherein the castering assistance motor effects optimization of drive wheel motors of the at least two independently driven drive motors so that the drive wheel motors are optimized to effect linear inertial changes in autonomous transport vehicle motion.

14. An autonomous transport vehicle for transporting items in a storage and retrieval system, the autonomous transport vehicle comprising:
   a frame;
   a controller;
   at least two independently driven drive wheels mounted to the frame; and
   at least one caster wheel, of a non-holonomic steering system, is mounted to the frame and having a castering assistance motor that engages the at least one caster wheel so as to impart castering assistance torque to the at least one caster wheel assisting castering of the at least one caster wheel;
   wherein the controller is communicably connected to the castering assistance motor and configured to effect, via castering assistance torque from the castering assistance motor assisting castering input from vehicle yaw generated by differential torque from the at least two independently driven wheels, substantially scrubless castering of the at least one caster wheel with the autonomous transport vehicle in motion with a predetermined kinematic state.

15. The autonomous transport vehicle of claim 14, wherein the controller is configured to determine the castering assistance torque as a supplement torque supplementing castering input to the at least one caster wheel, from vehicle yaw, to effect scrubless castering of the at least one caster wheel.

16. The autonomous transport vehicle of claim 14, wherein the castering assistance motor is configured so that a maximum castering assistance torque is a motor rated torque of the castering assistance motor, and commanded castering assistance torque is configured wherein resistance from castering scrub at each predetermined kinematic state is substantially negated so as to effect the substantially scrubless castering along and throughout each vehicle path via the commanded castering assistance torque, substantially independent of vehicle path and kinematic state.

17. The autonomous transport vehicle of claim 16, wherein the commanded castering assistance torque for each respective caster wheel, of the at least one caster wheel, is determined independently for each respective caster wheel so as to effect substantially scrubless castering of each respective caster wheel substantially independent of vehicle path and kinematic state.

18. The autonomous transport vehicle of claim 16, wherein the commanded castering assistance torque for each respective caster wheel, of the at least one caster wheel, is independently determined to effect substantially scrubless castering of each respective caster wheel, and wherein castering assistance torque respectively commanded for each corresponding caster wheel varies between corresponding caster wheels of the at least one caster wheel based on turn radius.

19. An autonomous transport vehicle for transporting items in a storage and retrieval system, the autonomous transport vehicle comprising:
 a frame;
 a controller;
 at least two independently driven drive wheels mounted to the frame; and
 at least one caster wheel mounted to the frame and having a castering assistance motor that engages the at least one caster wheel so as to impart castering assistance torque to the at least one caster wheel assisting castering of the at least one caster wheel;
 wherein the controller is communicably connected to the castering assistance motor and configured to effect castering of the at least one caster wheel with the autonomous transport vehicle in motion with a predetermined kinematic state via a combination of vehicle yaw, generated by differential torque from the at least two independently driven drive wheels, and castering assistance torque, from the castering assistance motor, the castering assistance torque being developed substantially negating resistance from castering scrub in each predetermined kinematic state of the autonomous transport vehicle.

20. The autonomous transport vehicle of claim 19, wherein the controller is configured to determine the castering assistance torque as a supplement torque supplementing castering input to the at least one caster wheel, from vehicle yaw, to effect scrubless castering of the at least one caster wheel.

* * * * *